United States Patent
Dudar

(10) Patent No.: US 10,907,563 B2
(45) Date of Patent: Feb. 2, 2021

(54) EVAPORATIVE EMISSIONS DIAGNOSTIC DURING EXTENDED IDLE STATE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 16/022,535

(22) Filed: Jun. 28, 2018

(65) Prior Publication Data

US 2020/0003143 A1    Jan. 2, 2020

(51) Int. Cl.

| | |
|---|---|
| *B60W 10/06* | (2006.01) |
| *B60W 10/10* | (2012.01) |
| *B60W 10/22* | (2006.01) |
| *B60W 20/50* | (2016.01) |
| *B60W 40/08* | (2012.01) |
| *F02D 29/02* | (2006.01) |
| *F02D 41/00* | (2006.01) |

(Continued)

(52) U.S. Cl.
CPC ............. *F02D 41/22* (2013.01); *B60W 10/22* (2013.01); *B60W 20/50* (2013.01); *B60W 40/08* (2013.01); *F02D 41/004* (2013.01); *G07C 5/0808* (2013.01); *B60W 2040/0881* (2013.01); *B60W 2710/22* (2013.01); *B60Y 2200/92* (2013.01); *F02D 2041/225* (2013.01)

(58) Field of Classification Search
CPC .. F02D 41/22; F02D 41/004; F02D 2041/225; F02D 41/021; F02D 29/06; F02D 41/16; F02D 25/0809; F02D 29/02; B60W 40/08; B60W 10/22; B60W 20/50; B60W 2040/0881; B60W 2710/22; B60Y 2200/92; G07C 5/0808
USPC ........................................................ 701/22
See application file for complete search history.

(56) References Cited

U.S. PATENT DOCUMENTS

| | | |
|---|---|---|
| 6,308,119 B1 | 10/2001 | Majkowski et al. |
| 7,562,559 B2 | 7/2009 | Chung et al. |

(Continued)

OTHER PUBLICATIONS

Grayson, W., "Ford to build a hybrid F-150 with integrated generator for jobsites," Available Online at https://www.equipmentworld.com/two-bridge-replacements-complete-at-rondout-reservoir-in-ny-2/, Jan. 3, 2017, 3 pages.

(Continued)

*Primary Examiner* — Behrang Badii
*Assistant Examiner* — Hossam M Abd El Latif
(74) *Attorney, Agent, or Firm* — Geoffrey Brumbaugh; McCoy Russell LLP

(57) ABSTRACT

Methods and systems are provided for reducing release of undesired evaporative emissions to atmosphere for a hybrid vehicle. In one example, a method comprises locking a transmission of the vehicle in park until a request to override the locking is received at a controller of the vehicle, and conducting one or more routines related to reducing release of undesired evaporative emissions to atmosphere, where the one or more diagnostic routines rely on a vacuum derived from an engine of the vehicle combusting air and fuel while the transmission is locked in park. In this way, completion rates for conducting the one or more routines may be improved, and issues related to the release of undesired evaporative emissions to atmosphere may be reduced or avoided.

20 Claims, 9 Drawing Sheets

(51) Int. Cl.
  *F02D 41/02*  (2006.01)
  *F02D 41/16*  (2006.01)
  *F02D 41/22*  (2006.01)
  *G07C 5/08*   (2006.01)

(56) References Cited

U.S. PATENT DOCUMENTS

| | | |
|---|---|---|
| 8,336,526 B1 | 12/2012 | Martin et al. |
| 9,429,114 B2 | 8/2016 | Dudar et al. |
| 2010/0307463 A1* | 12/2010 | Peters ............... F02M 25/0872 |
| | | 123/520 |
| 2015/0159601 A1* | 6/2015 | Luehrsen ......... F02M 35/10222 |
| | | 123/564 |
| 2017/0096974 A1* | 4/2017 | Dudar .................. B60W 20/00 |
| 2017/0130680 A1* | 5/2017 | Dudar ............... F02M 25/0809 |
| 2019/0108693 A1* | 4/2019 | Dudar ............... F02M 25/0809 |
| 2019/0333037 A1* | 10/2019 | Rayner ............... G06Q 30/018 |

OTHER PUBLICATIONS

Dudar, A., "Evaporative Emissions System Diagnostic for GTDI Engines Using an Electronic Booster," U.S. Appl. No. 15/727,318, filed Oct. 6, 2017, 131 pages.

* cited by examiner

EVAPORATIVE EMISSIONS DIAGNOSTIC DURING EXTENDED IDLE STATE

FIELD

The present description relates generally to methods and systems for controlling a vehicle engine to conduct diagnostics as to the presence or absence of sources of undesired evaporative emissions during engine idle conditions where the vehicle is prevented from moving.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may be intermittently diagnosed for the presence of undesired emissions that could release fuel vapors to the atmosphere. Undesired evaporative emissions may be identified using engine-off natural vacuum (EONV) during conditions when a vehicle engine is not operating. In particular, a fuel system and/or an emissions control system may be isolated at an engine-off event. The pressure in such a fuel system and/or an emissions control system will increase if the tank is heated further (e.g., from hot exhaust or a hot parking surface) as liquid fuel vaporizes. As a fuel tank cools down, a vacuum is generated therein as fuel vapors condense to liquid fuel. Vacuum generation is monitored and undesired evaporative emissions identified based on expected vacuum development or expected rates of vacuum development. However, the entry conditions and thresholds for a typical EONV test may be based on an inferred total amount of heat rejected into the fuel tank during the prior drive cycle. The inferred amount of heat may be based on engine run-time, integrated mass air flow, miles driven, etc. If these conditions are not met, the entry into the evaporative emissions test is aborted. Thus, hybrid electric vehicles, including plug-in hybrid electric vehicles (HEV's or PHEV's), particularly pose a problem for effectively controlling evaporative emissions. For example, primary power in a hybrid vehicle may be provided by the electric motor, resulting in an operating profile in which the engine is run only for short periods. As such, adequate heat rejection to the fuel tank may not be available for EONV diagnostics.

An alternative to relying on inferred sufficient heat rejection for entry into an EONV diagnostic test is to instead actively pressurize or evacuate the fuel system and/or emissions control system via an external source. In one example, the external source may comprise engine intake manifold vacuum during engine operation. In such an example, the fuel system and/or evaporative emissions system may be sealed from atmosphere, and subsequently engine intake manifold vacuum may be applied to the fuel system and evaporative emissions system by commanding open a valve (e.g. a canister purge valve) positioned in a purge line fluidically coupling the evaporative emissions system to engine intake. With engine intake manifold vacuum applied to the fuel system and/or evaporative emissions system, pressure in the fuel system and/or evaporative emissions system may decrease to a predetermined negative pressure threshold. Once the predetermined negative pressure threshold is reached, the fuel system and/or evaporative emissions system may be sealed from the engine, and pressure bleed-up monitored. An increase in pressure to a threshold pressure level during a predetermined time duration may indicate undesired evaporative emissions. However, in such an approach, during the pressure bleed-up phase, fuel slosh from road feedback may skew results as a result of increased pressure in the fuel system due to fuel movement. If slosh is detected, via a fuel level sensor for example, the evaporative emissions test may be aborted, thus decreasing completion rates for evaporative emissions test diagnostics. Federal emission regulations require completion rates above preselected rates.

To avoid such issues, U.S. Pat. No. 6,308,119 teaches diagnosing undesired evaporative emissions at engine idle, where the evaporative emissions system is drawn down to a reference negative pressure via engine intake vacuum and is then sealed and the evaporative emissions test diagnostic conducted by monitoring bleed-up as described above. However, the inventors herein have recognized potential issues with such a method. In one example, completion rates for such diagnostics are often low because of the long amount of time it typically takes to evacuate large fuel tanks. For example, if a vehicle stopped at a stoplight initiates an engine idle evaporative emissions test diagnostic that relies on intake manifold to evacuate the fuel tank, the stoplight may change to green before the diagnostic has completed, thus resulting in the diagnostic being aborted and completion rates suffering as a result. Furthermore, with the advent of start/stop (S/S) vehicle technology where the engine is stopped when vehicle speed is below a threshold vehicle speed, opportunities for conducting evaporative emissions diagnostics at engine idle conditions are further reduced.

The inventors have herein recognized the above-mentioned issues, and have developed systems and methods to at least partially address them. In one example, a method comprises locking a transmission of a vehicle in park until a request to override the locking of the transmission in park is received at a controller of the vehicle, and conducting a diagnostic routine that relies on a vacuum derived from an engine combusting air and fuel while the transmission is locked in park. In this way, the diagnostic routine may be conducted under conditions where the vehicle is prevented from being moved, which may ensure the diagnostic routine is completed without being aborted. Furthermore, the results of such a diagnostic routine may be more robust, or of higher confidence, under conditions where the vehicle is prevented from moving.

In one example, the locking of the transmission in park is in response to a request to power an onboard power box for supplying power to one or more devices internal or external to the vehicle via energy derived from the engine combusting air and fuel. In such an example, the onboard power box receives power from the engine operating to combust air and fuel, and thus the engine may additionally be used to generate the vacuum for conducting the diagnostic routine. In one example, the power box is a power take-off unit of the vehicle providing available shaft work for powering a device such as a hydraulic pump or other powered device.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
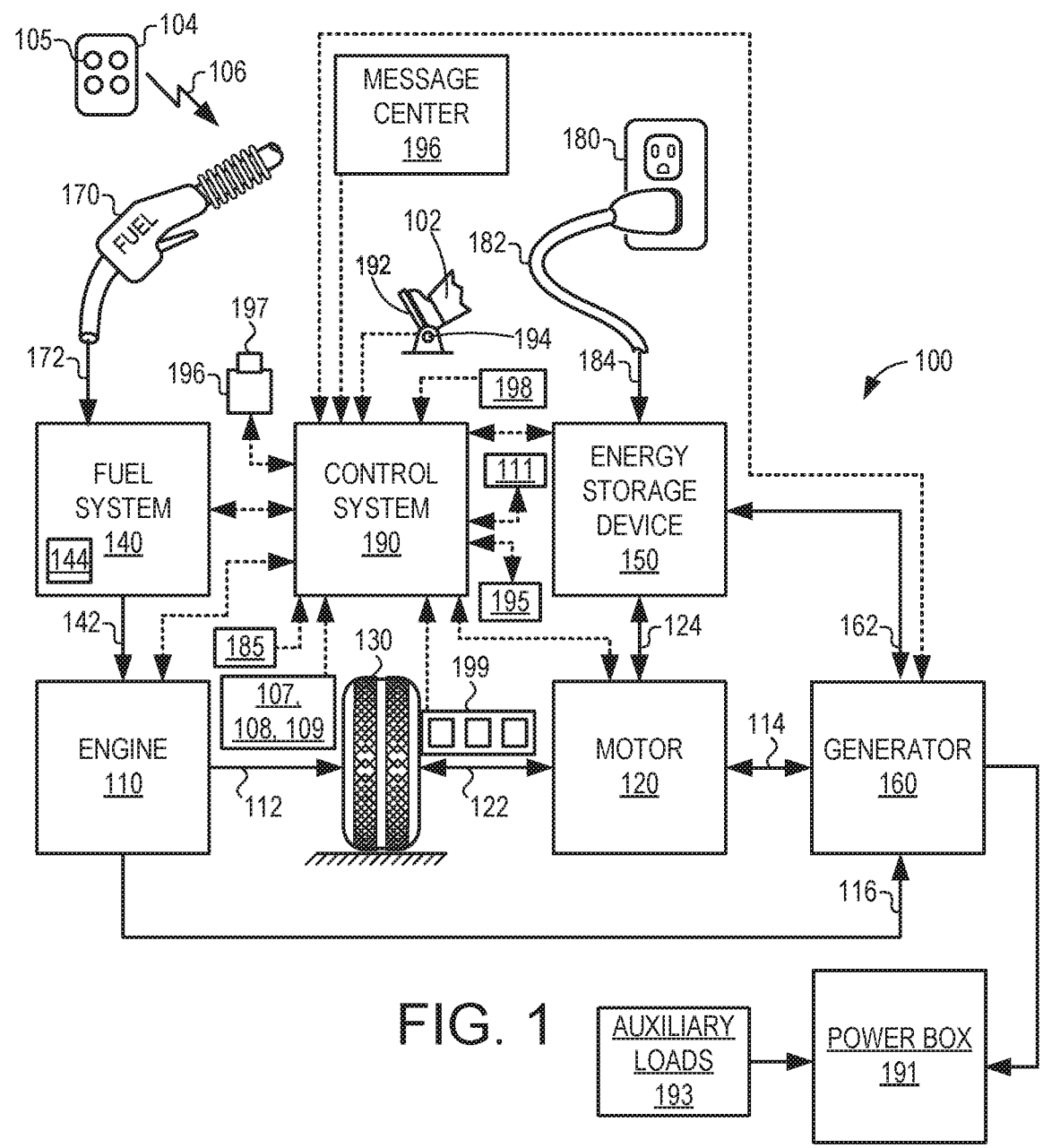
FIG. 1 schematically shows an example vehicle propulsion system.
Figure 2:
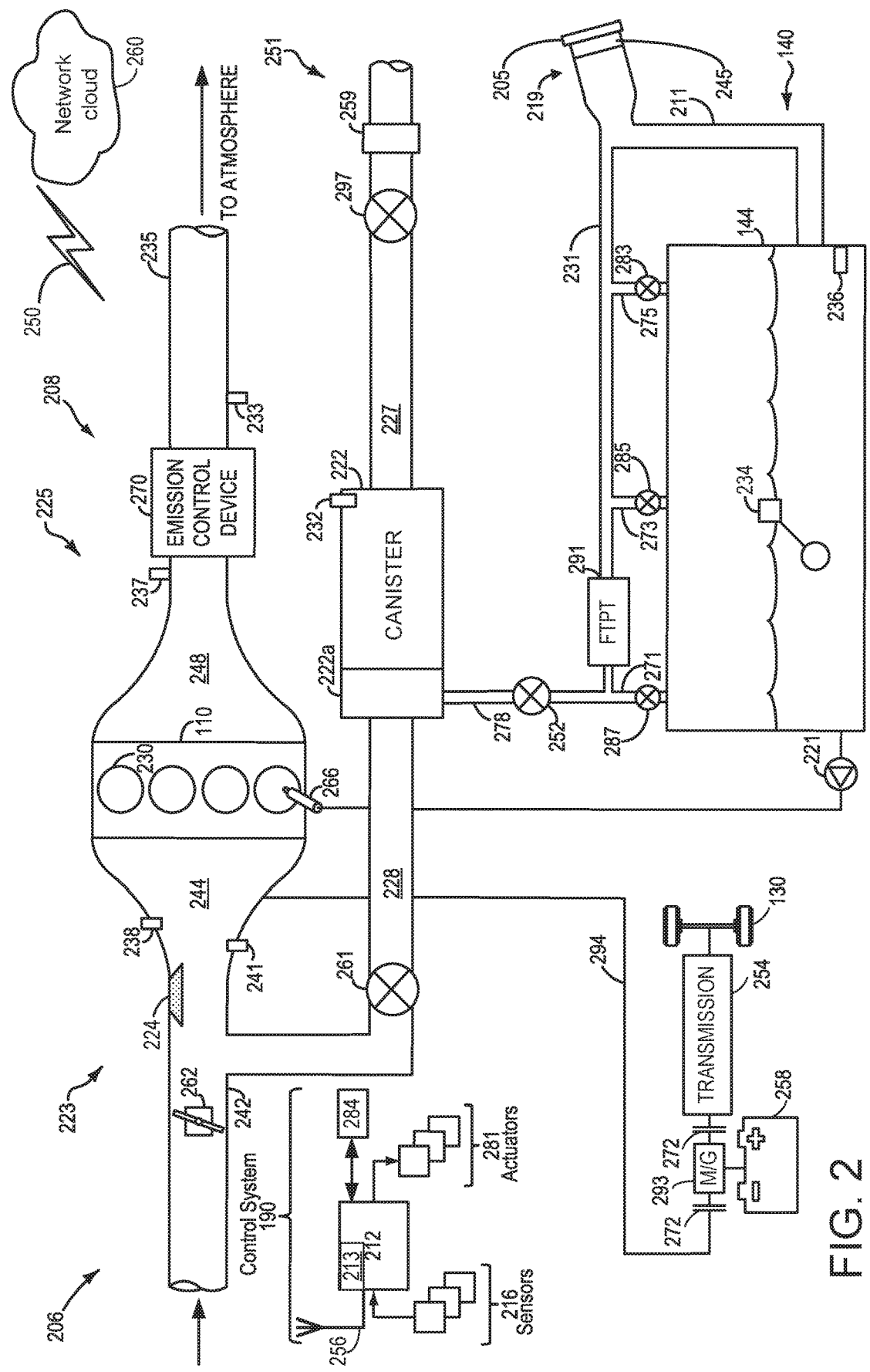
FIG. 2 schematically shows an example vehicle system with a fuel system and an evaporative emissions system.
Figure 5:
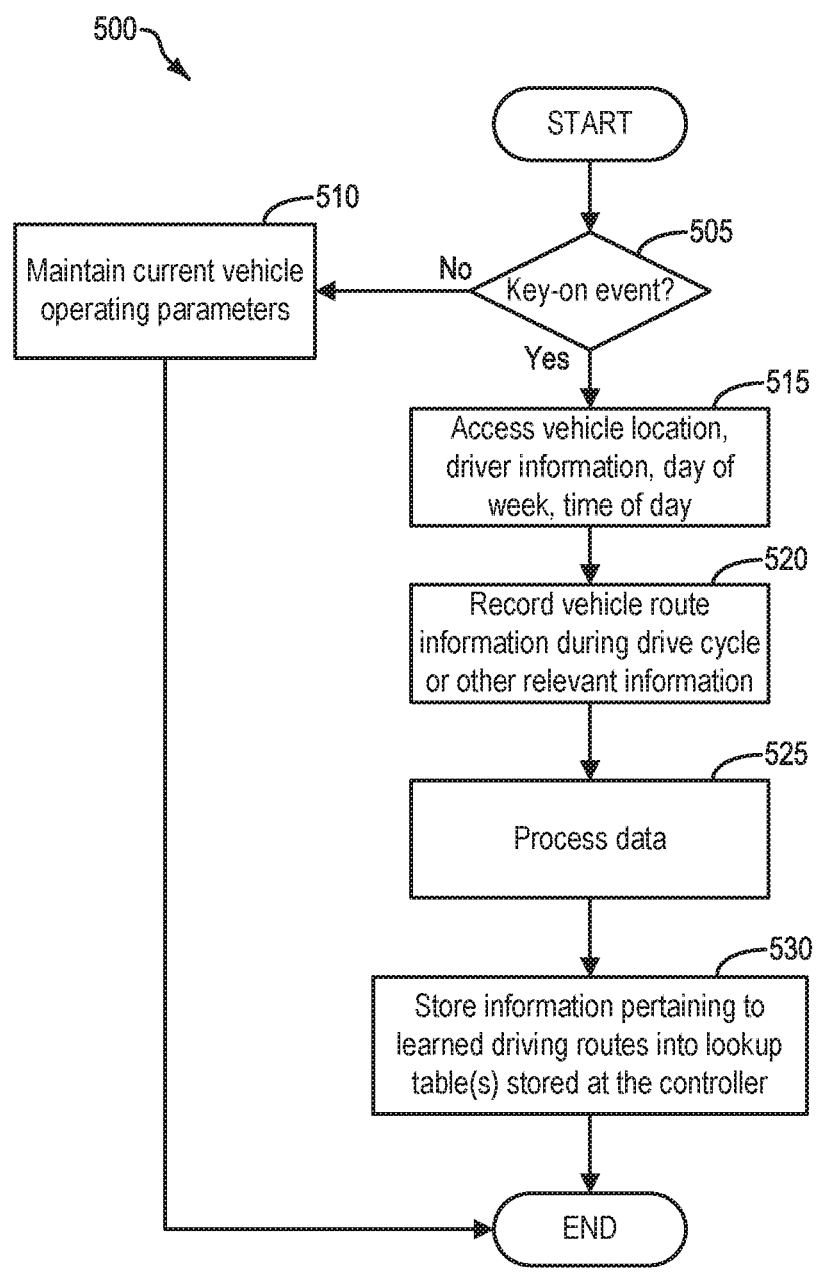
FIG. 5 depicts a high-level flowchart for an example method for learning when the onboard power box is utilized and for how long, as a function of time of day and day of week.
Figure 6:
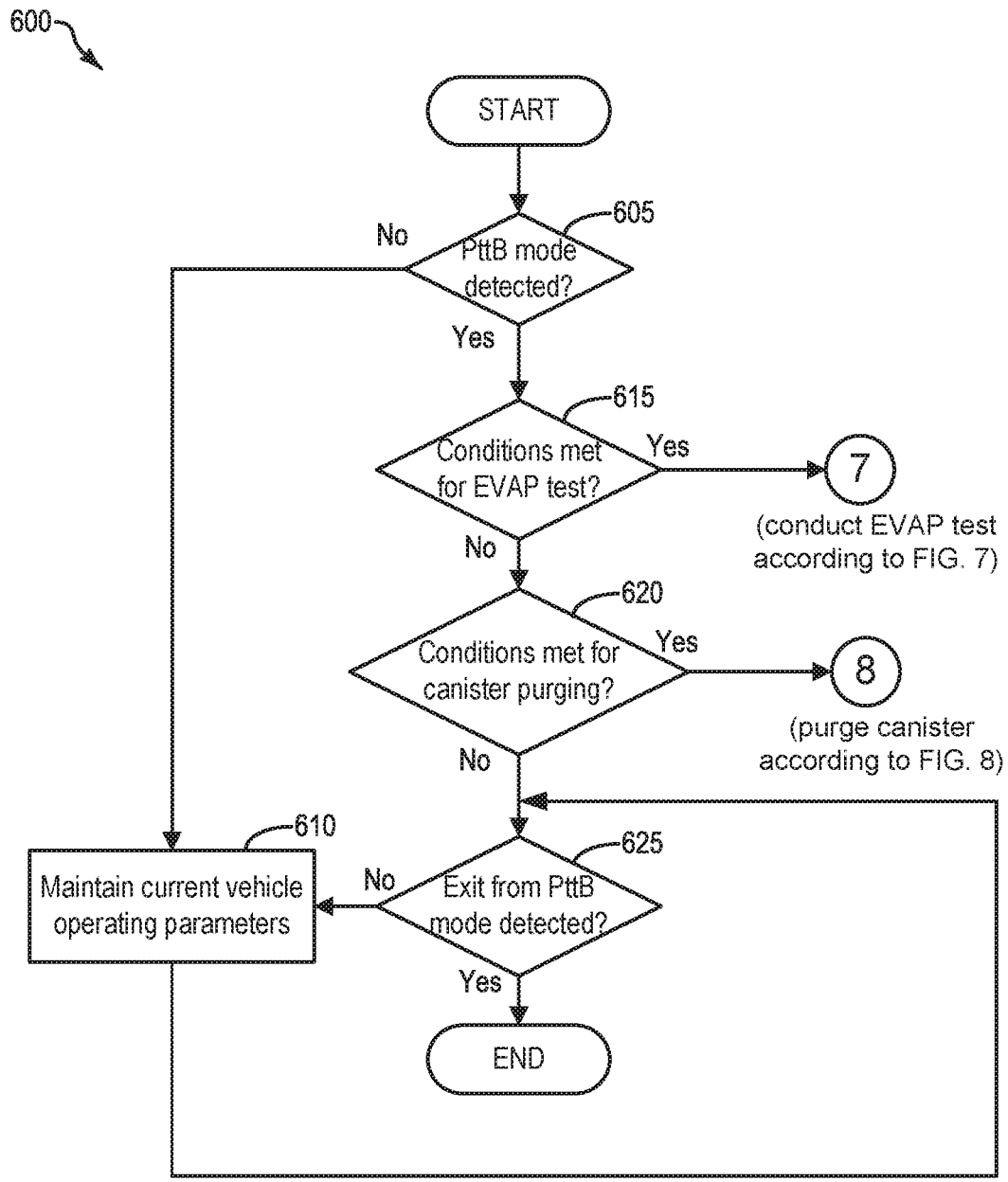
FIG. 6 depicts a high-level flowchart for an example method for determining whether conditions are met for conducting a test for presence or absence of undesired evaporative emissions, and/or whether conditions are met for purging a fuel vapor storage canister, during times when the onboard power box is being utilized.
Figure 7:
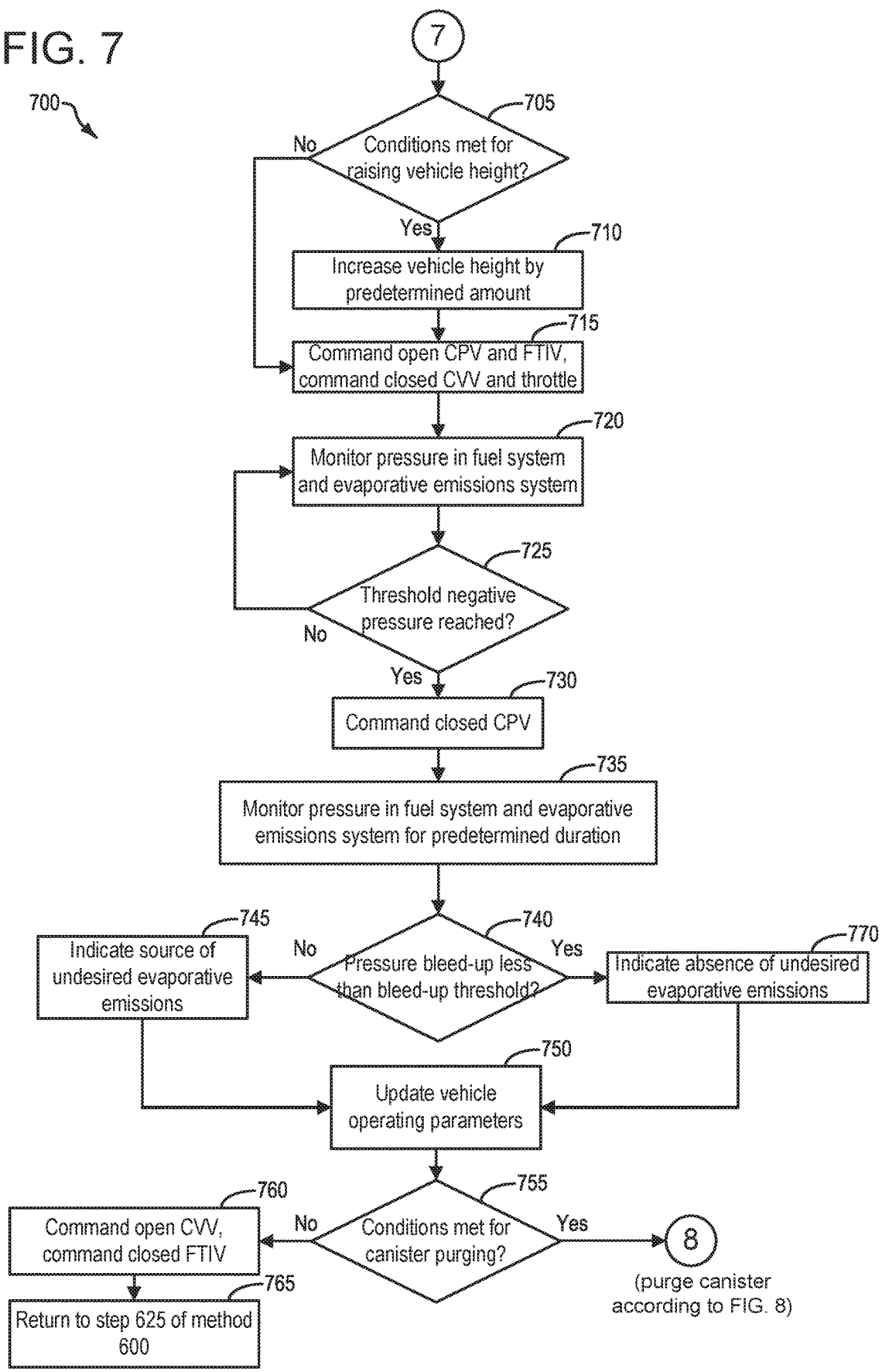
FIG. 7 depicts a high-level flowchart for an example method for conducting the test for the presence or absence of undesired evaporative emissions.
Figure 8:
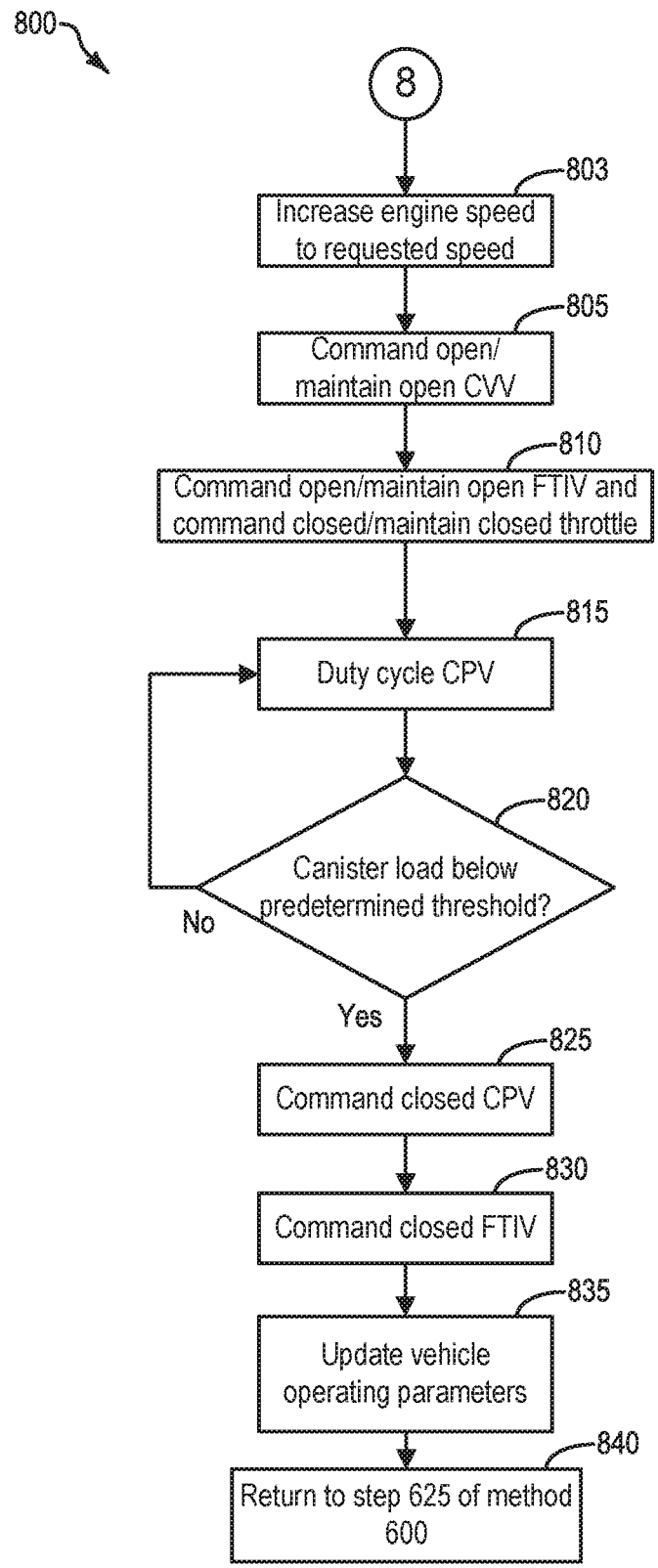
FIG. 8 depicts a high-level flowchart for an example method for conducting the purging of the fuel vapor storage canister.
Figure 9:
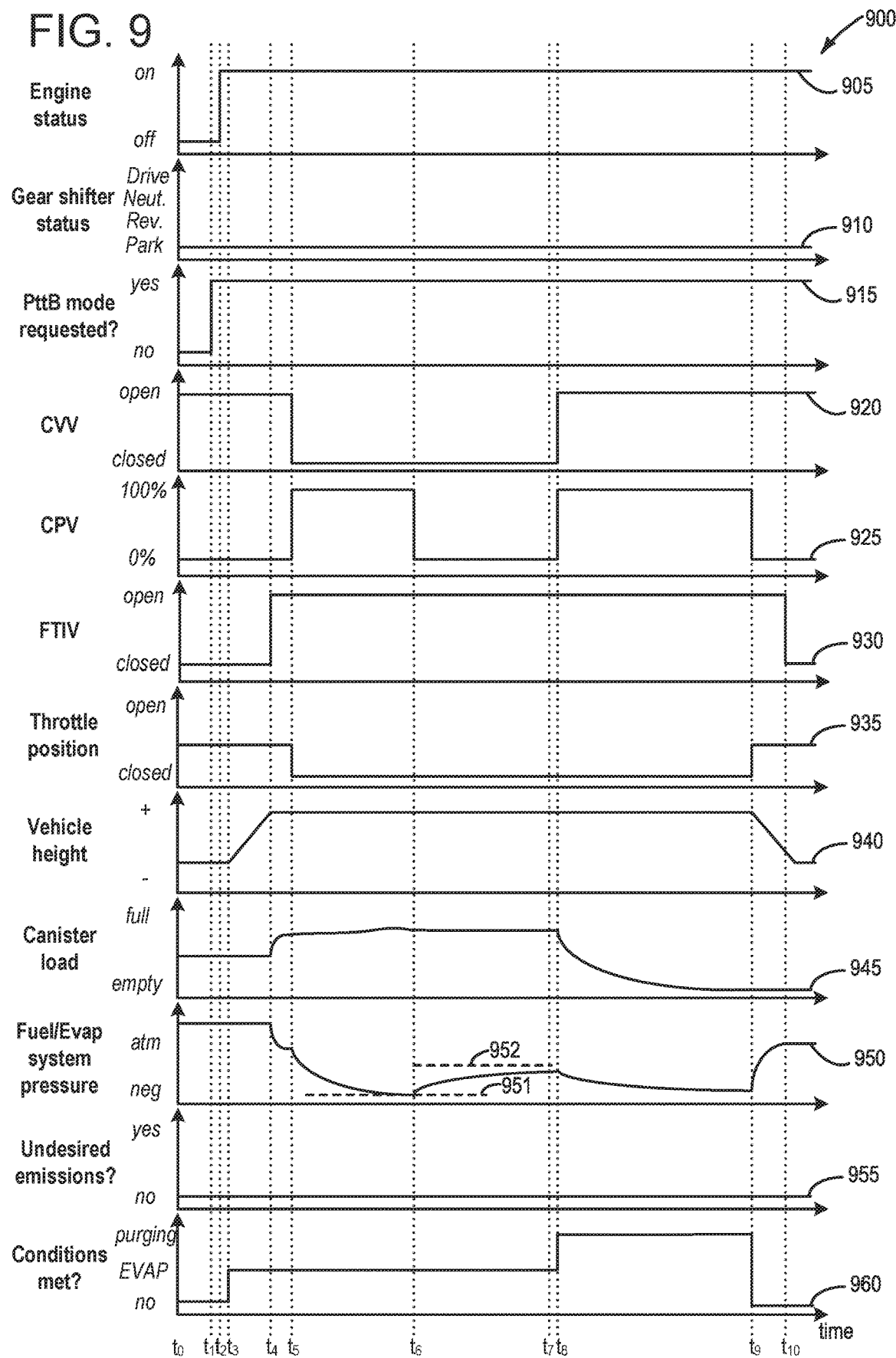
FIG. 9 depicts an example timeline that illustrates conducting the test for the presence or absence of undesired evaporative emissions and for purging the fuel vapor storage canister, while the onboard power box is being utilized.

The following description relates to systems and methods for conducting one or more diagnostic routines in a hybrid vehicle while the vehicle is operated in a mode (power to the box mode, or PttB mode) in which the engine is used to supply power to a generator which in turn supplies power to an onboard power box capable of powering one or more devices (e.g. tools, equipment, etc.) internal or external to the vehicle. Accordingly, a hybrid vehicle equipped with an onboard power box is depicted at FIG. 1. The one or more diagnostic routines may include a test diagnostic for a presence or absence of undesired evaporative emissions (e.g. fuel vapors) stemming from a source in an evaporative emissions system and/or fuel system of the vehicle. In another example, the one or more diagnostic routines may include a routine that involves purging a fuel vapor storage canister capable of capturing and storing fuel vapors from the fuel system, the fuel vapor storage canister positioned in the evaporative emissions system. Accordingly, a vehicle system that includes an engine system, a fuel system, and an evaporative emissions system is depicted at FIG. 2. Conducting the one or more diagnostic routines may rely on an indication that it is predicted or learned that the vehicle will be operated in the PttB mode where the engine is supplying power to the onboard power box for a duration that is longer than a timeframe for which the one or more diagnostic routines may be conducted. More specifically, a vehicle controller may be configured to learn durations for which the vehicle will be operated in the PttB mode, for particular days of the week and particular times of day. A learned PttB mode usage frequency as a function of day of the week is graphically depicted at FIG. 3. Learned durations for which the vehicle is operated in PttB mode as a function of time of a particular day, is graphically depicted at FIG. 4. A method for learning expected durations for which the vehicle will be operated in the PttB mode as a function of time of day and day of week, is depicted at FIG. 5. FIG. 6 depicts a high-level example method for selecting whether to conduct the test for presence or absence of undesired evaporative emissions (EVAP test) or to conduct the canister purging operation, in response to an indication that the PttB mode is requested. Accordingly, FIG. 7 depicts a high-level example method for conducting the EVAP test, while FIG. 8 depicts a high-level example method for conducting the canister purging operation. In some examples, both the EVAP test and the canister purging operation may be conducted while the vehicle is being operated in the PttB mode, for example in response to a first request to enter into the PUB mode, both diagnostic routines may be conducted prior to the controller receiving a second request to exit the PttB mode. Accordingly, an example timeline is depicted at FIG. 9 for conducting both diagnostic routines during a single timeframe of PttB mode operation.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Vehicle propulsion system 100 may include a power box 191 which may receive power from generator 160. Power box 191 may include one or more alternating current (AC) and/or direct current (DC) power outlets for performing tasks including but not limited to powering power tools at work sites, powering lighting, powering outdoor speakers, powering water pumps, supplying power in situations including emergency power outage, powering tailgating activities, powering RV camping activities, etc. In other words, the AC and/or DC power outlets of power box 191 may be used to power auxiliary electrical loads 193 (e.g. tools), for example loads external to the vehicle. The power outlets may be external to a cabin of the vehicle (e.g. bed of truck) and/or internal to the cabin of the vehicle. In one example, power box 191 may include power sources of 120V, 2,400 W (either stationary or mobile vehicle operating conditions). In another example, power box 191 may include power sources of 120V/240V, 7,400 W (either stationary or mobile vehicle operating conditions).

Generator 160 may comprise an onboard full sine wave inverter. For providing power via power box 191, generator 160 may receive energy via the energy storage device 150 in some examples, where DC power is converted via the generator 160 to AC power for powering power box 191 under situations where AC power is desired. Additionally or alternatively, the engine 110 may be activated to combust air and fuel in order to generate AC power via generator 160 for powering power box 191. The vehicle operator 102 may utilize vehicle instrument panel 196, which may include input portions for receiving operator input, for controlling power box 191. Discussed herein, to power auxiliary electrical loads, the vehicle operator 102 may select a mode of operation via the vehicle instrument panel termed "power to the box" or PttB mode. For example, the vehicle operator may select PttB mode via the vehicle instrument panel, and may further select an engine speed (revolutions per minute or RPM) that the engine may run at for powering the power box 191.

When the vehicle is stationary, the transmission (not shown at FIG. 1 but see FIG. 2) may be requested to be configured in park mode in order to allow the vehicle operator 102 to select PttB mode. In other words, PttB mode may not be selected unless the transmission is in park mode, or in other words, if a gear shifter (not shown) is positioned in park. With the gear shifter in park, it may be understood that the transmission is locked. Once the PttB mode has been selected via the vehicle operator 102, the control system 190 may lock or prevent the gear shifter and thus transmission from being moved to another mode (e.g. drive mode), until an override switch or override button is pressed via the vehicle operator 102. The reliance on the override switch to enable the transmission to be moved out of park mode may prevent the vehicle from being driven under circumstances where auxiliary equipment is connected to the power box 191. In other words, the vehicle control system will not allow the transmission to be shifted from park and the vehicle driven, until the PttB mode is overridden via the vehicle operator 102.

As will be discussed in further detail below, it is herein recognized that there may be options for conducting diagnostics pertaining to presence or absence of undesired evaporative emissions stemming from the fuel system 140 and/or evaporative emissions system (see FIG. 2) when the vehicle is operating in PttB mode. More specifically, with the engine in operation to provide power to the power box 191, engine manifold vacuum may be utilized to evacuate the evaporative emissions system and fuel system to a predetermined negative pressure threshold. Next, the evaporative emissions system and fuel system may be sealed from the engine, and pressure bleed-up may be monitored to assess whether there is a source of undesired evaporative emissions stemming from the evaporative emissions system and/or fuel system. The advantages of conducting such a test while the vehicle is operating in PttB mode include the transmission being locked in park, thus preventing vehicle motion and therefore fuel slosh, while the test is taking place. Furthermore, as will be discussed in further detail below, another advantage may include an ability to predict based on previous learned usage of the power box 191, how long the power box 191 will be used at a particular instance. In this way, the test for presence or absence of undesired evaporative emissions may be initiated while the vehicle is operating in PttB mode only if it is inferred that the vehicle will be operating in PttB mode for a duration sufficient to complete the test. By only initiating such tests when it is likely that the tests will complete, completion rates may be improved, and wear and tear on valves may be reduced as compared to wear and tear on the valves when completion rates are lower.

Along similar lines, as will be discussed in further detail below, another diagnostic routine may additionally or alternatively be conducted while the vehicle is operating in PttB mode. This diagnostic routine may include a fuel vapor storage canister purging operation. Specifically, a fuel vapor storage canister positioned in the evaporative emissions system (see FIG. 2) may capture and store fuel vapors from the fuel system 140. The fuel vapors may be periodically purged from the canister to an intake of the engine for combustion. In this way, rather than fuel vapors (undesired evaporative emissions) being released to atmosphere, the fuel vapors may be captured and stored and then routed to the engine for combustion. While the vehicle is being operated in PttB mode, canister purging operations may be conducted in such a way as to ensure the canister is effectively cleaned (e.g. canister load less than 5% full, or less than 2% full) of fuel vapors, as will be discussed in greater detail below.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and sensors dedicated to indicating the occupancy-state of the vehicle, for example seat load cells 107, door sensing technology 108, and onboard cameras 109. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. As will be described in further detail below, in one example, active suspension system 111 may be employed in order to raise the vehicle a determined amount while the vehicle is parked and with the engine operating to provide power to the power box 191, in order to reduce an amount of heat transferred from the engine to the fuel system, for conducting a test diagnostic for the presence or absence of undesired evaporative emissions stemming from the fuel system and/or evaporative emissions system. Such indications may be made at least in part via one or more of ambient temperature/humidity sensor 198, onboard cameras 109, and infrared (IR) cameras 185. For example via the use of ambient temperature/humidity sensor 198, onboard cameras 109, and IR cameras 185, the vehicle may be capable of indicating ambient temperature, ground surface temperature, and ground surface composition (e.g.

asphalt, concrete, etc.). If it is indicated that significant fuel vaporization may occur due to the conditions that the vehicle is parked under in addition to the running of the engine to power the power box 191, the vehicle suspension may be raised such that the likelihood of fuel vaporization is reduced, which may prevent fuel vaporization issues from confounding results of the evaporative emissions test diagnostic procedure. More specifically, fuel vaporization may contribute to pressure bleed-up during the evaporative emissions test diagnostic procedure, which may result in a determination that there is a source of undesired evaporative emissions stemming from the fuel system and/or evaporative emissions system, when in fact, there is not. By raising the vehicle via the active suspension system, such fuel vaporization issues may be reduced or avoided.

Turning now to FIG. 2, it shows a schematic depiction of a vehicle system 206. The vehicle system 206 (which may be the same vehicle system as vehicle propulsion system 100 depicted at FIG. 1) includes an engine system 208 coupled to an emissions control system 251 and fuel system 140. Emission control system 251 includes a fuel vapor container or canister 222 which may be used to capture and store fuel vapors. In some examples, vehicle system 206 may be a hybrid electric vehicle system, as discussed above at FIG. 1.

The engine system 208 may include an engine 110 having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 110 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Fuel system 140 may include a fuel tank 144 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. All the injectors in the example shown in FIG. 2 inject fuel directly into each cylinder (i.e., direct injection) rather than injecting fuel into or against an intake valve of each cylinder (i.e., port injection), however multiple fuel injector configurations are possible without departing from the scope of the present disclosure. It will be appreciated that fuel system 140 may be a return-less fuel system, a return fuel system, or various other types of fuel system. Fuel tank 144 may hold a plurality of fuel blends, including fuel with a range of alcohol concentrations, such as various gasoline-ethanol blends, including E10, E85, gasoline, etc., and combinations thereof. A fuel level sensor 234 located in fuel tank 144 may provide an indication of the fuel level ("Fuel Level Input") to controller 212. As depicted, fuel level sensor 234 may comprise a float connected to a variable resistor. Alternatively, other types of fuel level sensors may be used. In some examples, a temperature sensor 236 is positioned within fuel tank 144, to measure fuel temperature. Though only one temperature sensor 236 is shown, multiple sensors may be employed. In some examples, an average of the temperature values detected by those sensors can be taken to obtain a more precise measure of the temperature within the interior of the fuel tank 144. All such temperature sensors are configured to provide an indication of fuel temperature to controller 212.

Vapors generated in fuel system 140 may be routed to an evaporative emissions control system 251 which includes a fuel vapor canister 222 via vapor recovery line 231, before being purged to the engine intake 223. Vapor recovery line 231 may be coupled to fuel tank 144 via one or more conduits and may include one or more valves for isolating the fuel tank during certain conditions. For example, vapor recovery line 231 may be coupled to fuel tank 144 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 144 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 140.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 140 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV), if included, may control venting of fuel tank 144 with the atmosphere. FTIV 252, when included, may be positioned between the fuel tank and the fuel vapor canister within conduit 278. FTIV 252 may be a normally closed valve, that when opened, allows for the venting of fuel vapors from fuel tank 144 to canister 222. Fuel vapors may then be vented to atmosphere, or purged to engine intake system 223 via canister purge valve 261.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252, if included, while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, if included, while maintaining canister purge valve 261 closed, to depressurize the fuel tank before allowing enabling fuel to be added therein. As such, isolation valve 252, if included, may be kept open during the refueling operation to allow refueling vapors to be stored in the canister. After refueling is completed, the isolation valve, if included, may be closed.

As yet another example, the fuel system may be operated in a canister purging mode (e.g., after an emission control device light-off temperature has been attained and with the engine running), wherein the controller 212 may open canister purge valve 261 while closing isolation valve 252 (or in some examples maintaining isolation valve 252 open), if included. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, temperature sensor 236, pressure sensor 291, mass air flow (MAF) sensor 238, manifold air pressure (MAP) sensor 241, and canister temperature sensor 232. Exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Other sensors such as pressure, temperature, and composition sensors may be coupled to various locations in the vehicle system 206. As another example, the actuators may include fuel injector 266, throttle 262, fuel tank isolation valve 252 (if included), canister vent valve 297, canister purge valve 261, and refueling lock 245. The control system 190 may include a controller 212. The controller may receive input data from the various sensors, process the input data, and trigger the actuators in response to the processed input data based on instruction or code programmed therein corresponding to one or more routines. Example control routines are described herein with regard to FIGS. 5-8.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 140 and evaporative emissions control system 251 to confirm that the fuel system and/or evaporative emissions control system are not compromised (degraded, or have a source of undesired evaporative emissions). As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump (not shown) and/or using engine intake manifold vacuum (discussed in further detail below).

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Vehicle system 206 may be a hybrid vehicle with multiple sources of torque available to one or more vehicle wheels 130. In the example shown, vehicle system 206 may include an electric machine 293. Electric machine 293 may be a motor or a motor/generator (e.g. 120 and/or 160). Crankshaft 294 of engine 110 and electric machine 293 are connected via a transmission 254 to vehicle wheels 130 when one or more clutches 272 are engaged. In the depicted example, a first clutch is provided between crankshaft 294 and electric machine 293, and a second clutch is provided between electric machine 293 and transmission 254. Controller 212 may send a signal to an actuator of each clutch 272 to engage or disengage the clutch, so as to connect or disconnect crankshaft 294 from electric machine 293 and the components connected thereto, and/or connect or disconnect electric machine 293 from transmission 254 and the components connected thereto. Transmission 254 may be a gearbox, a planetary gear system, or another type of transmission. The powertrain may be configured in various manners including as a parallel, a series, or a series-parallel hybrid vehicle.

Electric machine 293 receives electrical power from a traction battery 258 to provide torque to vehicle wheels 130. Electric machine 293 may also be operated as a generator to provide electrical power to charge traction battery 258, for example during a braking operation. In some examples, traction battery 258 may be the same as energy storage device 150 depicted above at FIG. 1. Alternatively, traction battery 258 may be different than energy storage device 150.

The controller 212 may be coupled to a wireless communication device 256 for direct communication of the vehicle system 206 with a network cloud 260. Using wireless communication 250 via the wireless communication device 256, the vehicle system 206 may retrieve data regarding current and/or upcoming ambient conditions (such as ambient humidity, temperature, pressure, etc.) from the network cloud 260. In one example, at completion of drive cycles, during drive cycles, and/or any time the vehicle is being operated, a database 213 within the controller 212 may be updated with information including driver behavioral data, engine operating conditions, date and time information, traffic information, traveled routes, requested modes of vehicle operation at particular locations (e.g. requests to enter PttB mode at particular locations) and time of day, etc.

Controller 212 may be communicatively coupled to other vehicles or infrastructures using appropriate communications technology, as is known in the art. For example, control system 190 may be coupled to other vehicles or infrastructures via wireless communication 250 which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructures can be either direct between vehicles/infrastructures, or can be multi-hop. In some examples, longer range communications (e.g. WiMax) may be used in place of, or in conjunction with, V2V, V2I2V, etc., to extend the coverage area by a few miles. In still other examples, vehicle control system 190 may be in wireless communication 250 with other vehicles or infrastructures via network cloud 260 and the internet.

Vehicle system 206 may also include an on-board navigation system 284 (for example, a Global Positioning System). The navigation system 284 may include one or more location sensors for assisting in estimating vehicle speed, vehicle altitude, vehicle position/location, etc. As discussed above, control system 190 may further be configured to receive information via the internet or other communication networks. Information received from the GPS may be cross-referenced to information available via the internet to determine local weather conditions, local vehicle regulations, etc. In some examples, information from the GPS may enable vehicle location information, traffic information, etc., to be collected via the vehicle.

Figure 3:
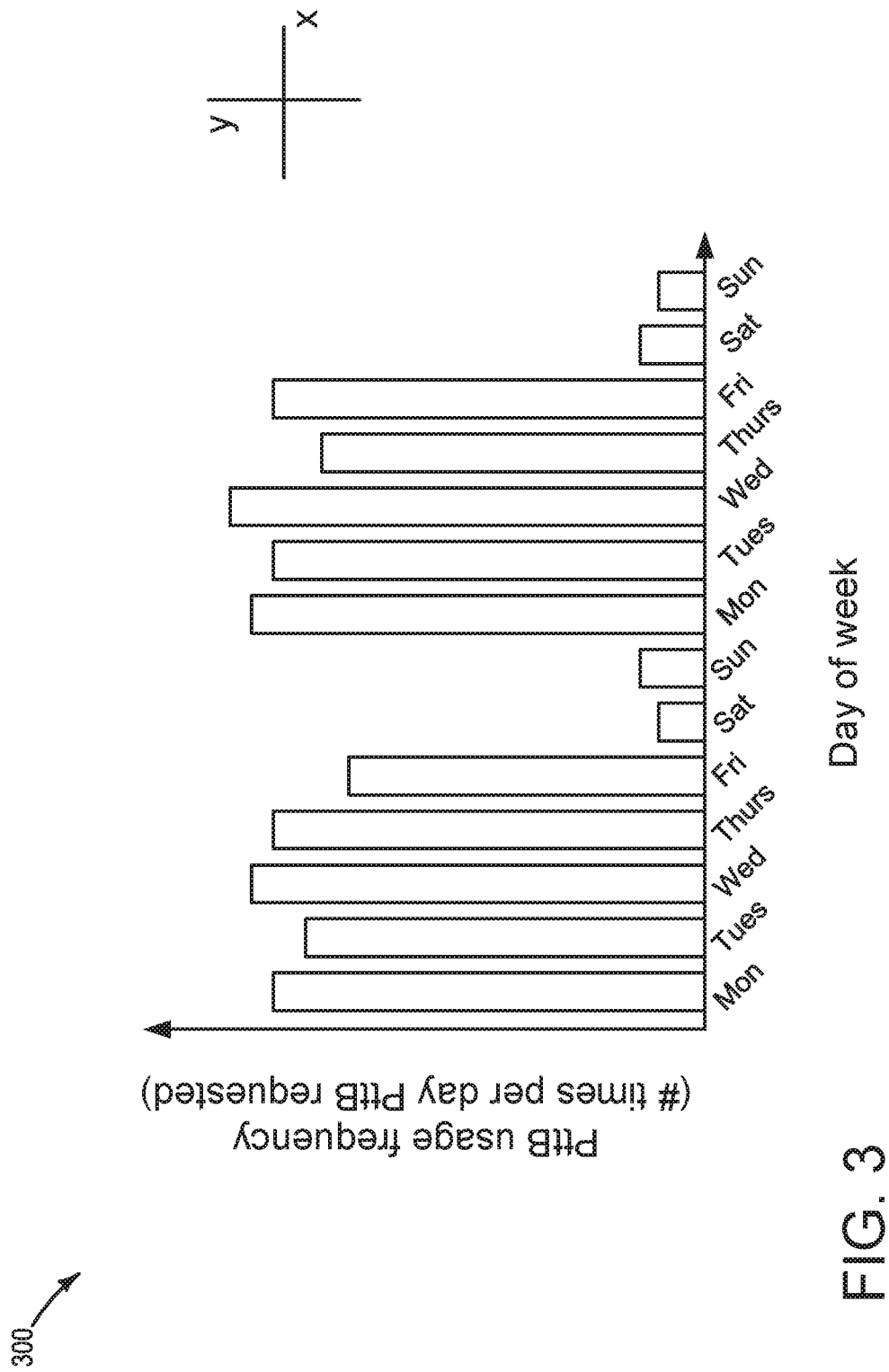
FIG. 3 graphically depicts a frequency of usage of an onboard power box as a function of day of the week for a particular vehicle.

Turning now to FIG. 3, a graph 300 is depicted, illustrating a PttB usage frequency as a function of day of the week. Illustrated is two weeks (Monday-Sunday and the following Monday-Sunday) on the x axis, and PttB usage frequency on the y-axis. PttB usage frequency is depicted as the number of times per day that a vehicle operator requests PttB usage. While exact numbers of times per day are not depicted, it may be understood that values increase along the y-axis the further from the x-axis.

As can be seen from FIG. 3, the vehicle operator frequently requests PttB usage during the work week (Monday-Friday), and utilizes the PttB mode less on the weekends (Saturday-Sunday). Thus, in this example, the vehicle operator may be a construction worker who travels to job sites and plugs equipment into the onboard power box (e.g. 191) in order to conduct duties related to particular jobs. While the PttB mode is requested, the vehicle transmission is locked in park, preventing the vehicle from being moved until the vehicle operator manually overrides the PttB mode. Thus, when the vehicle is operating in the PttB mode with the engine combusting air and fuel in order to power the generator which in turn provides power to the onboard power box, it may be desirable to initiate a test for the presence or absence of undesired evaporative emissions stemming from the fuel system and/or evaporative emissions system that relies on engine manifold vacuum. By conducting such a test when the vehicle is prevented from moving, issues related to fuel slosh and other fuel vaporization issues (which may adversely impact interpretation of the results of such a diagnostic) may be avoided. Furthermore, provided that the PttB mode is requested for a duration longer than the duration of time it takes to conduct such a test for undesired evaporative emissions, then such a test may proceed without being aborted due to the vehicle being driven. Thus, as will be discussed in further detail below, by learning patterns related to when the vehicle operator requests PttB mode usage and for how long, tests for undesired evaporative emissions may be initiated with the vehicle in PttB mode responsive to an indication that the vehicle transmission will be locked in park for a duration greater than the duration of time it takes to conduct the evaporative emissions test diagnostic procedure. In this way, completion rates may be improved and reliability of results of such tests may be increased. Furthermore, PttB mode may offer opportunities for conducting other routines for which it may be advantageous to conduct while the vehicle is locked in park. One such routine involves purging of the fuel vapor storage canister, as discussed in further detail below.

Figure 4:
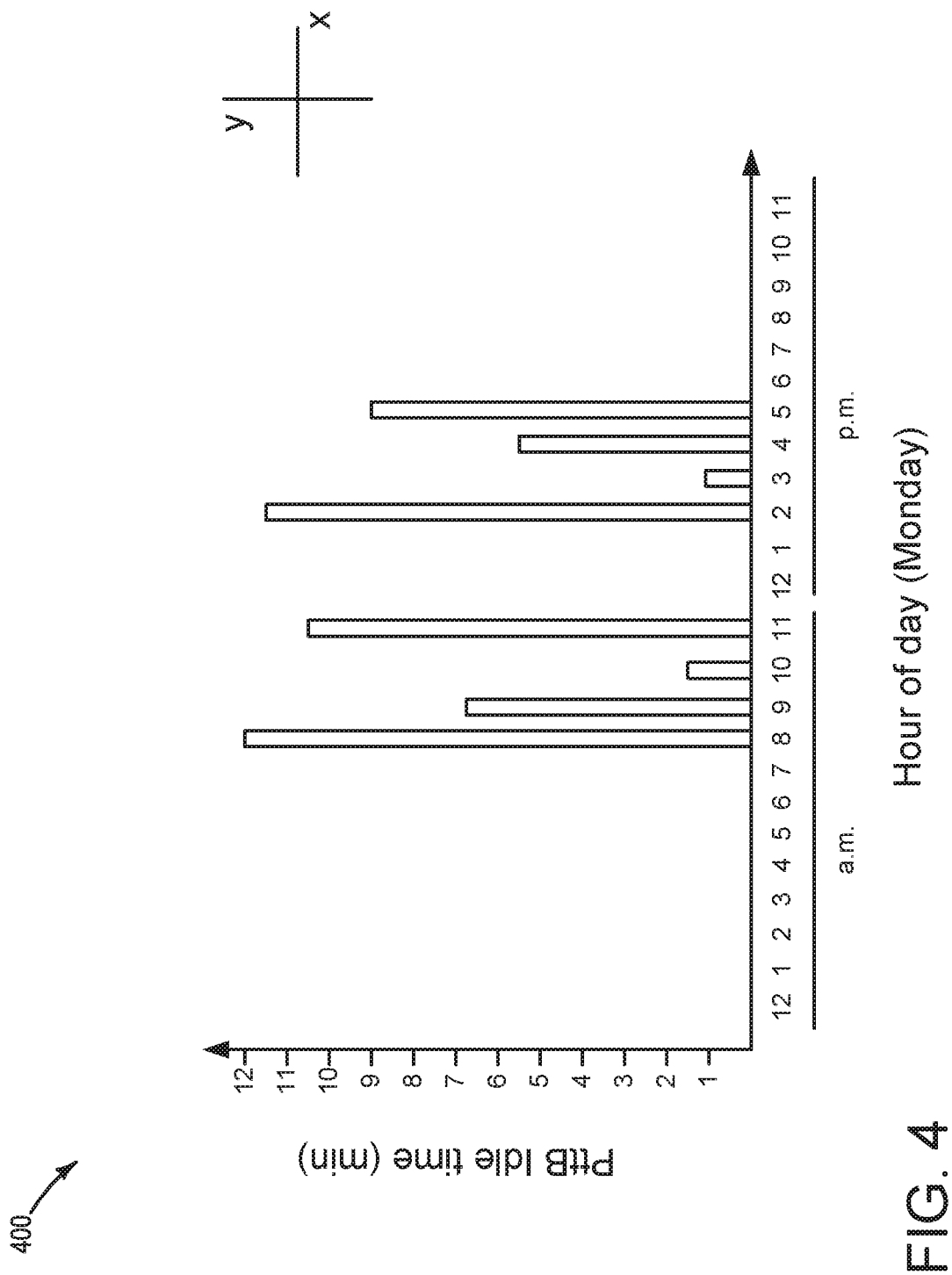
FIG. 4 graphically depicts variations in amounts of time that the onboard power box is utilized for, as a function of hour of a particular day.

Accordingly, turning now to FIG. 4, another graph 400 is depicted, illustrating a 24 hour cycle of a particular day (Monday in this example). It may be understood that the graph depicted at FIG. 3 and the graph depicted at FIG. 4 are from the same vehicle. Thus, the day depicted here at FIG. 4 (Monday) corresponds to a Monday of the graph depicted at FIG. 3. For graph 400, hour of day is depicted on the x-axis, while PttB idle time (in minutes) is depicted on the y-axis. More specifically, PttB idle time refers to an amount of time that the PttB mode is requested, from the initiation of PttB mode responsive to a vehicle operator requesting the mode, to the time at which the vehicle operator overrides the PttB mode. In other words, in this example graph 400, PttB idle time refers to the amount of time the engine is activated in order to supply power to the onboard power box (e.g. 191), with the transmission locked in park.

As can be seen from graph 400, PttB mode is requested between 8 and 9 a.m. for about 12 minutes, and is requested between 9-10 a.m. for about 6 minutes. Between 10 and 11 a.m., PttB mode is requested for a very brief (approximately one minute) amount of time. Between 11 a.m. and noon, PttB mode is requested for about 11 minutes. PttB mode is next requested between 2 and 3 p.m. for about 12 minutes, and between 3 and 4 p.m. for about one minute. Between 4-5 p.m. PttB mode is requested for about 5.5 minutes, and between 5-6 p.m. PttB mode is requested for about 9 minutes. For the other hours of the day, PttB mode is not requested.

As alluded to above and which will be discussed further in detail below, there may be options for learning approximately how long PttB mode may be requested on a particular day at a particular time, and such information may be used to determine whether to initiate the diagnostic for the presence or absence of undesired evaporative emissions and/or canister purging routine. For example, referring to FIG. 4, responsive to the PttB mode being requested between 8-9 a.m. of a Monday, it may be ascertained by the controller (e.g. 212) as to whether it is likely that the PttB mode will be requested for a duration of time greater than the duration of time it takes to conduct the test for undesired evaporative emissions and/or canister purging operation. Determining whether it is likely that the PttB mode will be requested for such a duration may include the querying of one or more lookup tables stored at the controller, where the one or more lookup tables are populated based on learned information related to when PttB mode is requested (e.g. day of week, time of day) and for how long (e.g. minutes). In this example graph 400, it may be understood that the evaporative emissions test may be conducted and completed at any of the PttB mode requests except those comprising requests between 10-11 a.m. and between 3-4 p.m. For example, it may take anywhere from 2-5 minutes to conduct such an evaporative emissions test diagnostic and/or canister purging operation that relies on engine manifold vacuum, and thus, such test diagnostics may be conducted responsive to PttB mode use times greater than the 2-5 minutes.

Thus, the systems described herein and with regard to FIGS. 1-2 may enable a system for a hybrid vehicle comprising an onboard power box that receives power from a generator that is in turn powered by an engine, the onboard power box capable of supplying power to one or more devices external to the hybrid vehicle. The system may further include a controller with computer readable instructions stored on non-transitory memory that when executed during a condition where the engine is operating to supply power to the onboard power box, cause the controller to conduct one or more diagnostic routines that rely on a vacuum derived from the engine combusting air and fuel in response to an indication that it is predicted that a duration for which the engine is requested to supply power to the onboard power box is of a greater duration than a timeframe for conducting the one or more diagnostic routines.

In such a system, the system may further comprise a vehicle instrument panel capable of receiving a first request from a vehicle operator to supply power to the onboard power box. In such an example, the controller may store further instructions to, in response to the first request to supply power to the onboard power box, lock a transmission of the hybrid vehicle in park to prevent the hybrid vehicle from moving until a second request from the vehicle operator to override the first request is received via the vehicle instrument panel.

In such a system, the system may further comprise one or more of seat load cells, door sensing technology, and onboard cameras capable of indicating whether the hybrid vehicle is occupied. In such an example, the controller may store further instructions to conduct the one or more diagnostic routines that rely on a vacuum derived from the engine combusting air and fuel in response to an indication that the hybrid vehicle is unoccupied.

Accordingly, turning now to FIG. 5, a high level example method 500 for learning common driving routines driven in a vehicle, is shown. More specifically, method 500 may be utilized to learn common driving routes, and may further be utilized to learn/predict particular locations where it is likely that a vehicle operator will request PttB mode of vehicle operation. For example, method 500 may be used to obtain information related to day, time of day, and for how long PttB mode is requested for particular locations that the vehicle travels to. Such information pertaining to learned routes may be stored in lookup table(s) stored at the vehicle controller, and may be used at least in part to select whether to conduct tests for the presence or absence of undesired evaporative emissions stemming from the vehicle fuel system and/or evaporative emissions system and/or canister purging operations.

Method 500 will be described with reference to the systems described herein and shown in FIGS. 1-2, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-2. The controller may employ actuators to alter states of devices in the physical world according to the methods depicted below.

Method 500 begins at 505 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 505, a key-on event is not indicated, method 500 may proceed to 510, and may include maintaining current vehicle operating parameters. For example, at 510, method 500 may include maintaining engine system, fuel system, and evaporative emissions system components in their current conformations and or current modes of operation. Method 500 may then end.

Returning to 505, responsive to a key-on event being indicated, method 500 may proceed to 515, and may include accessing vehicle location, driver information, day of the week (DOW), time of day (TOD), etc. A driver's identity (if a driver is present) may be input by the driver, or inferred based on driving habits, seat position, cabin climate control preferences, voice activated commands, etc. Vehicle location may be accessed via the onboard navigation system, for example via GPS, or other means such as via wireless communication with the internet.

Proceeding to 520, method 500 may include recording vehicle route information or other relevant information commencing from the key-on event. The vehicle controller may continuously collect data from various sensor systems and outside sources regarding the vehicle's operations/conditions, location, traffic information, local weather information, etc. The data may be collected by, for example, GPS (e.g. 284), onboard cameras (e.g. 109), etc. Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, and air quality sensors for detecting temperature, humidity, etc. Still further, at 520, the vehicle controller may also retrieve various types of non-real time data, for example information from a detailed map, which may be stored in at the controller or which may be retrieved wirelessly.

As one example, data acquired by the controller at 520 may include information on whether PttB mode is requested via the vehicle operator. The data may include what time of day (and what day of week/month) the PttB mode is requested, and may further include how long the particular PttB mode request lasts. In other words, the duration of the PttB mode may be obtained. More specifically, the controller may obtain data related to what time the vehicle operator requests the PttB mode, and what time the vehicle operator overrides the PttB mode, for particular locations.

Accordingly, data regarding particular vehicle driving routes or other relevant information (e.g. PttB mode duration with respect to time of day and location) may be obtained and stored at the vehicle controller. Proceeding to 525, method 500 may include processing the obtained data to establish predicted/learned driving routes, and may further include processing the data to establish particular geographical locations where PttB mode is often requested for particular amounts of time on particular days at particular times.

For example, numerous trip vectors and corresponding information may be obtained and stored at the vehicle controller, such that predicted/learned driving routes may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes and other relevant information (e.g. PttB mode requests and duration of said requests for particular locations and times).

Thus, learning driving routes at 525 may include determining particular driving routes (or key-on events where the vehicle is not driven) associated with PttB usage requests. As one example, a vehicle operator may drive the vehicle to a job site, and may request PttB mode in a fairly regularly fashion at the particular job site. Thus, the controller may process data associated with acquired information related to the particular job site and PttB mode requests, to establish likelihoods that PttB mode will be requested at the particular job site at particular hours of the day, and for how much time.

Such likelihoods may in some examples comprise several different confidence estimations. For example, it may be highly likely that a particular PttB request will comprise a particular duration, there may be a medium likelihood that such a PttB request will comprise such a duration, or a low likelihood that such a PttB request will comprise such a duration. The likelihoods may be based on empirically-acquired data. For example, the more times that a vehicle operator requests PttB mode at a particular time (e.g. within a threshold window of time, the threshold window comprising within 30 minutes or less, 20 minutes or less, 15 minutes or less, etc.) on a particular day of the week, the higher the likelihood that the duration for which the PttB mode is expected to last will actually correspond to that expected duration. Such likelihoods may be stored at the controller and may be utilized at least in part for determining, at particular PttB mode requests, whether or not to initiate the test for presence or absence of undesired evaporative emissions and/or canister purging operation.

Proceeding to 530, method 500 may include storing the information discussed pertaining to learned driving routes and PttB mode requests into one or more lookup table(s) at the vehicle controller. Such lookup tables may be utilized to indicate whether it is likely that a particular request to enter into PttB mode will last long enough to conduct the test diagnostic for presence or absence of undesired evaporative emissions, without the vehicle operator overriding the request prior to the test diagnostic being completed. Such lookup tables may additionally or alternatively be utilized to indicate whether it is likely that a particular PttB mode request is of a duration where a purging operation where the fuel vapor storage canister (e.g. 222) is cleaned of fuel vapors may be conducted without the vehicle operator overriding the PttB mode request prior to the canister being sufficiently cleaned.

Accordingly, turning now to FIG. 6, a high-level example method 600 is depicted, for determining whether conditions are met for conducting the test diagnostic pertaining to whether there is a source of undesired evaporative emissions stemming from the fuel system and/or evaporative emissions system (also referred to herein as EVAP test) and/or whether conditions are met for conducting a fuel vapor canister purging operation. Method 600 will be described with reference to the systems described herein and shown in FIGS. 1-2, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-2. The controller may employ actuators such as fuel injectors (e.g. 266), CPV (e.g. 261), FTIV (e.g. 252), CVV (e.g. 297), etc., to alter states of devices in the physical world according to the methods depicted below.

Method 600 begins at 605, and includes indicating if the vehicle operator has requested PttB mode. More specifically, the vehicle operator may request PttB mode via a vehicle instrument panel (e.g. 196), and such a request may be communicated to the vehicle controller. As discussed above, such a request may include the vehicle operator requesting a particular engine speed for particular applications.

If, at 605, PttB mode is not indicated to have been requested, method 600 may proceed to 610. At 610, method 600 may include maintaining current vehicle operating parameters. For example, if the vehicle is in operation being propelled via the engine, via electrical energy, or some combination of the two, such operation may be maintained. Method 600 may then end.

Returning to 605, if PttB mode is indicated to have been requested, method 600 may proceed to 615. At 615, method 600 may include indicating whether conditions are met for conducting the EVAP test. Specifically, at 615, method 600 may include querying the one or more lookup tables pertaining to learned PttB request data (discussed above at FIG. 5), to make a determination as to whether the particular PttB mode request comprises a learned PttB mode request, or whether the particular PttB request comprises a request where information pertaining to duration of the PttB mode of operation has not yet been learned. Thus, at 615, the vehicle controller may indicate particular location where the vehicle is parked, time of day, day of week, etc. The vehicle controller may thus determine whether the PttB request comprises a learned PttB request based on a comparison of the lookup tables with the current vehicle location, time of day of PttB mode request, day of week of PttB mode request, etc. Responsive to the PttB mode request comprising a learned PttB mode request, it may be further determined as to how long the vehicle is expected to be operated in the PttB mode of operation. Responsive to the PttB mode being expected/predicted to last for a duration greater than the amount of time it would take to conduct the EVAP test, then conditions may be indicated to be met at 615 for conducting the EVAP test.

In some examples, as discussed above at FIG. 5, the determination as to whether conditions are met for conducting the EVAP test may be a function of whether there is a high likelihood that the current PttB mode request is expected to last for a duration greater than the time it takes to conduct the EVAP test, a medium likelihood, or a low likelihood. In the case of a medium likelihood or a low likelihood, the controller may make a determination as to whether to initiate the EVAP test based on other factors such as whether or not a higher likelihood PttB mode request is expected at a later time in the day, whether (based on learned driving routes) there may be other opportunities outside of PttB mode requests for conducting the EVAP test where robust results may be expected, etc.

Conditions being met at 615 may additionally or alternatively include an indication that the EVAP test is requested via the controller. For example, if the EVAP test has been recently completed, for example earlier in the day, and another EVAP test is not currently requested, then conditions may not be indicated to be met at 615.

Conditions being met at 615 may additionally or alternatively include an indication that there is not already an indication of one or more sources of undesired evaporative emissions stemming from the fuel system and/or evaporative emissions system.

Conditions being met at 615 may additionally or alternatively include an indication that the vehicle is not occupied. More specifically, the vehicle operator may request the PttB mode of operation from within a cabin of the vehicle, and may then exit the vehicle (along with one or more other passengers) to conduct work using tools powered by the onboard power box (e.g. 191). If the vehicle were occupied, then movements inside the cabin may result in fuel slosh events or other disturbances which may adversely impact the pressure bleed-up portion of the EVAP test. Thus, at 615, conditions being indicated to be met for conducting the EVAP test may include an indication that the vehicle is unoccupied. Such a determination may be made via one or more of onboard cameras, seat load cells, door sensing technology, etc.

In some examples, the vehicle controller may issue a signal/message to the vehicle operator and/or passengers, alerting the operator and/or passengers of a request to exit the vehicle such that the EVAP test may be conducted. Such a message may be communicated verbally, for example via the instrument panel (e.g. via an HMI interface), and/or audibly via a speaker system of the vehicle. In some examples, such a message may be communicated audibly such that the vehicle operator and/or passengers standing near the vehicle may hear the request, and may avoid entering the vehicle until another signal indicates that the EVAP test has been completed. As one example, a car horn may sound in a particular pattern (e.g. two beeps of short duration, one beep of short duration followed by a beep of a longer duration, etc.), to indicate the initiation of the EVAP test, and a similar sound pattern may be used to indicate the completion of the EVAP test. In other words, the vehicle operator and/or other passengers who may otherwise access/enter the vehicle may be alerted to not do so while the EVAP test is being conducted.

In some examples, it may take some time for the vehicle to be exited via the vehicle operator and/or passengers, even if the vehicle operator and/or passengers have been alerted of the request to conduct the EVAP test. In such an example, method 600 may include delaying a determination as to whether to conduct the EVAP test, for a predetermined duration. The predetermined duration for which the EVAP test may be delayed may be a function of the expected duration the PttB mode is predicted/learned to last. For example, if the expected duration of the PttB mode of operation is only seven minutes and it takes three minutes for the EVAP test to be conducted, then at the most the controller may delay determination as to whether to conduct the EVAP test by about three minutes or so. In other words, the vehicle operator and/or passengers have about three minutes to exit the vehicle, otherwise conditions will no longer be indicated to be met for conducting the EVAP test. In another example, if the expected duration is 20 minutes, then the controller may delay determination as to whether to conduct the EVAP test by about 15 minutes or so. However, as will be discussed in further detail below, under circumstances where the EVAP test is delayed for such a reason, engine heat may contribute significantly to fuel vaporization which may potentially affect interpretation of the pressure bleed-up phase of the EVAP test. Thus, mitigating action may be undertaken to avoid such an issue under such circumstances, discussed in further detail below.

In some examples, the vehicle controller may alert the vehicle operator and/or other vehicle passengers of the amount of time in which to exit the vehicle in order to allow for the test to be conducted. For example, the vehicle controller may initially request the vehicle operator and/or passengers to exit the vehicle to conduct the EVAP test, as it may be desirable to conduct the EVAP test as early as possible responsive to the PttB mode being requested, to avoid excessive heat generation via the engine operating to combust air and fuel, prior to conducting the EVAP test. Responsive to the vehicle being continued to be occupied, the vehicle controller may issue another alert that signals to the vehicle operator and/or other passengers as to the timeframe with which to exit the vehicle so that the test may be conducted. In some examples, a timer may be displayed via the HMI, revealing how much time the vehicle operator and/or other passengers have to exit the vehicle in order for the EVAP test to be conducted.

If, at 615, conditions are indicated to be met for conducting the EVAP test, method 600 may proceed to conduct the EVAP test according to the method 700 depicted at FIG. 7.

Alternatively, if at 615 conditions are not indicated to be met for conducting the EVAP test, method 600 may proceed to 620. At 620, method 600 may include indicating whether conditions are met for purging the fuel vapor storage canister. More specifically, with the engine operating to combust air and fuel during PttB mode, the fuel vapor storage canister may be purged to engine intake where the fuel vapors purged from the canister may be combusted in the engine. Conditions being met for canister purging may include an indication that the learned/predicted duration of the PttB mode of operation is expected to be greater than a duration for which the canister may be sufficiently cleaned of fuel vapors (e.g. below a threshold canister load, the threshold comprising a loading state of 5% loaded or less, 10% loaded or less, etc.). Accordingly, conditions being met may be a function of how loaded the canister is with fuel vapors. For example, if the canister is less loaded, then the purging operation would be expected to take less time. Alternatively, if the canister is more loaded, then the purging operation would be expected to take more time.

Conditions being met at 620 may additionally or alternatively include an indication that the vehicle cabin is not occupied, similar to that discussed above. However, in other examples, conditions for canister purging may be met even if the vehicle is occupied. For example, as will be discussed below, purging the canister in PttB mode may be done aggressively (e.g. CPV immediately commanded to 100% duty cycle without a ramping up of the duty cycle), for which it may be desirable for no vehicle passengers to be in the vehicle. However, if the purging operation involves a less aggressive routine (e.g. ramping up of the CPV duty cycle over time to avoid engine stability issues), then the vehicle may be occupied.

Conditions being met at 620 may additionally or alternatively include an indication that a temperature of an exhaust catalyst (e.g. 270) is above a threshold temperature, for example above a light-off temperature for the catalyst. Thus, in some examples, conditions being met at 620 may include an indication that PttB mode duration is predicted to be longer than the expected duration it will take to both raise exhaust catalyst temperature to or above the light-off temperature, and to sufficiently purge the canister.

It may be understood that canister purging when the vehicle is in operation with the engine combusting air and fuel relies on feedback purge control, where an exhaust gas sensor positioned downstream of the combustion chambers monitors the concentration of vapors being routed to the engine, thus enabling engine control strategy to adjust air/fuel ratio to prevent engine hesitation due to rich air/fuel mixtures in the engine. Because such strategies rely on feedback control, canister purging events generally involve duty cycling the CPV (e.g. 261) at a rate lower than 100% duty cycle, and then ramping up the duty cycle of the CPV as the vapor concentration stemming from the canister is learned. However, while such strategy may be beneficial for preventing engine hesitation/engine stability issues, such strategy is not necessarily the most efficient for ensuring the canister is cleaned to its maximal extent possible. In other words, the ramping process may lower purging efficiency. Furthermore, for hybrid vehicles with limited engine run time, the canister may never or rarely be purged to the maximal extent possible due to the engine being stopped when vehicle speed drops below a threshold vehicle speed (e.g. for S/S vehicles), or stopped for energy efficiency reasons. For example, if a purging event is in progress and then the vehicle engages in an idle stop where the engine is shut down, then the purging event is discontinued. When the engine is later restarted, the purge strategy has to ramp up the purging of the canister all over again. As such, purging efficiency may be decreased in such circumstances.

It is herein recognized that with the vehicle in the PttB mode of operation and with the vehicle being unoccupied, there would not be occupants to experience any engine hesitation due to a more aggressive purge event conducted in order to maximally purge the canister. In other words, aggressively purging the canister may increase purging efficiency, and even if engine stability is temporarily compromised due to a rich mixture being combusted in the engine, because vehicle occupants are not in the vehicle, such engine hesitation would go unnoticed. Even in the event of an engine stall, the engine may be rapidly restarted via engine control strategy. Such issues may not negatively impact use of the onboard power box (e.g. 191), as any dip in engine stability may be compensated via the onboard energy storage device (e.g. battery) supplying the requested amount of power to the onboard power box to compensate for any engine stability issues.

Thus, it is herein recognized that purging of the canister while the vehicle is in PttB mode and under circumstances where the vehicle is unoccupied, may involve immediately stepping the duty cycle of the CPV to 100%, to aggressively purge the canister. By avoiding the ramping aspect of canister purging, the canister may be more efficiently cleaned of stored vapors.

It is further recognized that engine manifold vacuum may be increased to apply a larger vacuum on the canister during purging events with the vehicle in PttB mode. More specifically, as discussed above, a vehicle operator may input a desired engine speed for operating the vehicle in PttB mode, or in other examples the engine speed may comprise a predetermined engine speed for operating in PttB mode. Such an engine speed may not comprise a speed sufficient to aggressively purge the canister to its maximal extent, even with the CPV being duty cycled at 100%. Thus, for canister purging events in PttB mode where the CPV is duty cycled at 100%, engine speed may be increased above the engine speed for operating in PttB mode, which may generate a larger manifold vacuum for aggressively purging the canister. Energy generation in excess of what is requested via the onboard power box due to the increased engine speed may be used to charge the energy storage device. In this way, intake manifold vacuum may be increased which may result in more aggressive and thus more efficient purging of the canister, and may further serve to charge the onboard energy storage device. In examples where the onboard energy storage device cannot accept further charge, it may be understood that engine speed may not be increased under such circumstances. The above-mentioned details of aggressively purging the canister in PttB mode will be discussed in further detail below at FIG. 8.

Thus, at 620, if conditions are indicated to be met for conducting a canister purging operation, method 600 may proceed to conducting the canister purging operation according to the method depicted at FIG. 8. Alternatively, if conditions are not indicated to be met at 620, method 600 may proceed to 625. At 625, method 600 may include indicating whether a request to exit from PttB mode is indicated. For example, as discussed above, the request to exit from PttB mode may include the vehicle operator manually issuing a command (via the instrument control panel), to override the PttB mode of operation. If, at 625, such a request is not indicated, method 600 may include maintaining current vehicle operating parameters. For example, the engine may be controlled to maintain its current operational speed for providing power to the onboard power box. Alternatively, responsive to an indication of a request to override PttB mode, method 600 may end.

Returning to 615, if conditions are indicated to be met for conducting the EVAP test, method 600 may proceed to method 700 depicted at FIG. 7. Accordingly, turning to FIG. 7, a high-level example method 700 is depicted, for conducting the EVAP test while the vehicle is being operated in PttB mode. Method 700 will be described with reference to the systems described herein and shown in FIGS. 1-2, though it should be understood that similar methods may be applied to other systems without departing from the scope of this disclosure. Method 700 may be carried out by a controller, such as controller 212 in FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-2. The controller may employ actuators such as active suspension system (e.g. 111), CPV (e.g. 261), FTIV (e.g. 252), CVV (e.g. 297), etc., to alter states of devices in the physical world according to the methods depicted below.

Method 700 begins at 705, and may include indicating whether conditions are met for raising vehicle height in order to conduct the EVAP test. Specifically, reasons for conducting the EVAP test during PttB mode include avoiding fuel vaporization issues that may otherwise occur if the EVAP test were conducted while the vehicle was in operation (e.g. being propelled by the engine), the fuel vaporization issues stemming from fuel slosh events, for example. As discussed, such fuel vaporization issues may adversely impact interpretation of the results of such an EVAP test, as fuel vaporization may contribute to pressure bleed-up. However, it is herein recognized that with the vehicle stationary and with the engine in operation combusting air and fuel, there may be circumstances where excessive heat build-up underneath the vehicle may contribute to fuel vaporization issues which in turn may adversely impact interpretation of the results of such an EVAP test conducted while the vehicle is in PttB mode. More specifically, in a situation where the engine was combusting air and fuel just prior to entering into PttB mode, and continues to do so during PttB mode, depending on ambient temperature, surface that the vehicle is parked on, ambient conditions such as precipitation, engine run time just prior to initiating the EVAP test, aggressiveness of engine usage just prior to initiating the EVAP test, etc., it may be desirable to raise the vehicle height in order to increase airflow underneath the vehicle, which may reduce issues related to fuel vaporization during the EVAP test.

Accordingly, at 705, the vehicle controller may make a determination as to whether conditions are met for actively raising vehicle height prior to conducting the EVAP test. Conditions being met at 705 for actively raising vehicle height may include any one or more of the following examples. Conditions being met at 705 may include an indication that an engine heat rejection index is greater than a heat rejection index threshold, the heat rejection index based on an amount of time the engine was in operation combusting air and fuel, and how aggressive the engine was operated just prior to initiating the EVAP test. For example, aggressiveness may be indicated based on mass air flow in the engine (as monitored via the MAF sensor) summed over time. In this example, just prior to initiating the EVAP test may include a threshold duration of time prior to initiating the EVAP test. The threshold duration of time may include 10 minutes, between 10 minutes and 20 minutes, between 20 minutes and 30 minutes, greater than 30 minutes, etc. The heat rejection index threshold may comprise a threshold based on engine run time and engine use aggressiveness for which, above the threshold it may be likely that fuel vaporization issues may adversely impact the EVAP test if the vehicle is not raised, whereas below the heat rejection index threshold, fuel vaporization issues are not likely to adversely impact the EVAP test even if the vehicle is not raised. The heat rejection index threshold may in some examples be further based on ambient temperature. For example, increases in ambient temperature may influence the heat rejection index to being greater than the threshold. Ambient temperature may be indicated via the ambient temperature/humidity sensor (e.g. 198). The heat rejection index threshold may in some examples be further based on other ambient conditions such as precipitation, wind, etc. For example, precipitation may result in a cooling effect, similar to wind, which may bias the heat rejection index to being below the threshold. Information related to precipitation, wind, etc., may be obtained via the controller communicating wirelessly with the internet, via the onboard navigation system (e.g. GPS), etc. The heat rejection index threshold may in some examples be further based on an inferred ground surface temperature. For example, as discussed above, the ambient temperature sensor, onboard cameras (e.g. 109) and/or IR cameras (e.g. 185) may be utilized to infer ground surface temperature, and ground surface composition. Ground surface temperature/composition that may contribute to fuel vaporization issues may bias the heat rejection index to being over the heat rejection index threshold, whereby raising the vehicle may serve to reduce the impact of such fuel vaporization issues when conducting the EVAP test.

Accordingly, at 705, if conditions are indicated to be met for raising the vehicle height, method 700 may proceed to 710. At 710, method 700 may include actively raising vehicle height by a predetermined amount. It may be understood that actively raising vehicle height may include the onboard cameras (e.g. 109) conducting a scan of the surroundings of the vehicle to ensure that raising the vehicle can be accomplished without any adverse effects. For example, the onboard cameras may provide an indication that equipment is not currently being plugged into the onboard power box, that any equipment plugged into the onboard power box may not be adversely impacted by raising the vehicle height, etc.

Actively raising the vehicle may be conducted via the active suspension system (e.g. 111). For example, the vehicle may be raised as a function of how much greater the heat rejection index is above the heat rejection index threshold. In other words, the greater the amount by which the heat rejection index is above the heat rejection index threshold, the greater the amount by which the vehicle may be raised. In other examples, the vehicle may be raised to its maximal extent regardless of the amount by which the heat rejection index is greater than the threshold.

Whether or not the vehicle is actively raised via the active suspension system, method 700 may proceed to 715. At 715, method 700 may include commanding open the FTIV and the CPV, and commanding closed the CVV and the throttle. While not explicitly illustrated, the sequence at 715 may include first commanding open the FTIV, then commanding closed the CVV and the throttle, and then commanding open the CPV to apply engine manifold vacuum on the otherwise sealed fuel system and evaporative emissions system.

With engine manifold vacuum being applied on the fuel system and evaporative emissions system, pressure in the fuel system and evaporative emissions system may be monitored (e.g. via pressure sensor 291). Proceeding to 725, method 700 may include indicating whether a threshold negative pressure has been reached in the fuel system and evaporative emissions system. If not, method 700 may return to step 720. While not explicitly illustrated, it may be understood that if the threshold negative pressure is not reached within a predetermined threshold of time (e.g. 1-2 minutes or less) then there may be a source of gross undesired evaporative emissions, and thus method 700 may be aborted and the result stored at the controller. A malfunction indicator light (MIL) may be illuminated at the vehicle dash, alerting the vehicle operator of a request to service the vehicle.

Returning to 725, responsive to the threshold negative pressure being reached, method 700 proceeds to 730. At 730, method 700 may include commanding closed the CPV. In this way, the engine manifold vacuum may be sealed off from the fuel system and evaporative emissions system. With the fuel system and evaporative emissions system sealed from engine intake and from atmosphere, method 700 may proceed to 735 and may include monitoring pressure in the fuel system and evaporative emissions system for a predetermined duration (e.g. 1-3 minutes). Proceeding to 740, method 700 may include indicating whether pressure bleed-up in the fuel system and evaporative emissions system increases above a predetermined pressure bleed-up threshold and/or whether a pressure bleed-up rate in the fuel system and evaporative emissions system exceeds a pressure bleed-up rate threshold.

If, at 740, it is indicated that pressure bleed-up has increased above the pressure bleed-up threshold and/or if the pressure bleed-up rate exceeds the pressure bleed-up rate threshold, method 700 proceeds to 745. At 745, method 700 may include indicating the presence of a source of undesired evaporative emissions stemming from the fuel system and/or evaporative emissions system. The source may comprise a source greater than 0.02", for example. Responsive to such an indication, method 700 may proceed to 750. At 750, method 700 may include updating vehicle operating parameters to reflect the indication of the source of undesired evaporative emissions. For example, updating vehicle operating parameters may include setting a diagnostic trouble code at the controller, and may further include illuminating a MIL at the vehicle dash, alerting the vehicle operator of a request to service the vehicle. Updating vehicle operating parameters at 750 may further include updating a purging schedule so that purging is scheduled more frequently, in an attempt to direct any fuel vapors that may otherwise escape to atmosphere, to engine intake for combustion. Furthermore, updating vehicle operating parameters at 750 may include updating a canister loading state due to the EVAP test diagnostic having been conducted. For example, the act of conducting the EVAP test may load the canister with fuel vapors, as the fuel system is coupled to the evaporative emissions system via commanding open the FTIV, and the application of engine manifold vacuum on the sealed fuel system and evaporative emissions system may further draw fuel vapors from the tank into a portion of the fuel vapor canister.

Proceeding to 755, method 700 may include indicating whether conditions are met for conducting a fuel vapor canister purging operation. Similar to that discussed above at 620, conditions being met for canister purging may include an indication that the learned/predicted duration of the PttB mode of operation is expected to be greater than a duration for which the canister may be sufficiently cleaned of fuel vapors (e.g. below a threshold canister load, the threshold comprising a loading state of 5% loaded or less, 10% loaded or less, etc.). In other words, at 755, canister load may be indicated via the controller, and it may be determined as to whether the learned/predicted duration of the PttB mode is expected to continue for longer than the duration of time to sufficiently purge the canister. Conditions being met at 755 may additionally or alternatively include an indication that the vehicle cabin is not occupied, that the temperature of the exhaust catalyst is above the light-off temperature, etc.

If, at 755, conditions are indicated to be met for purging the canister, method 700 may proceed to method 800 depicted at FIG. 8. Alternatively, if conditions are not indicated to be met for purging the canister, method 700 may proceed to 760. At 760, method 700 may include commanding open the CVV, and then commanding closed the FTIV. More specifically, by commanding open the CVV, the evaporative emissions system and fuel system may be coupled to atmosphere, and responsive to pressure in the fuel system and evaporative emissions system being within a threshold of atmospheric pressure (e.g. within a 5% difference from atmospheric pressure), the FTIV may be commanded closed.

Proceeding to 765, method 700 may return to step 625 of method 600 where it may be determined whether the vehicle operator has requested an override of the PttB mode of operation as discussed above at FIG. 6.

Returning to 740, responsive to an indication that pressure bleed-up is less than the pressure bleed-up threshold and/or if the pressure bleed-up rate does not exceed the pressure bleed-up rate threshold, method 700 may proceed to 770. At 770, method 700 may include indicating an absence of undesired evaporative emissions stemming from the fuel system and/or evaporative emissions system. Such a result may be stored at the controller. Method 700 may then proceed to 750, where vehicle operating parameters are updated to reflect the passing result. Updating vehicle operating parameters may include updating canister loading state as discussed above. The rest of method 700 may proceed exactly as discussed above, and thus will not be reiterated for brevity.

As discussed above, conditions for purging the canister may be met with the vehicle operating in PttB mode either in the absence of also conducting the EVAP test (see FIG. 6), or subsequent to conducting the EVAP test (see FIG. 7). Accordingly, turning now to FIG. 8, a high-level example method 800 is depicted, for conducting the canister purging operation while the vehicle is being operated in PttB mode. Method 800 will be described with reference to the systems described herein and shown in FIGS. 1-2, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-2. The controller may employ actuators such as fuel injectors (e.g. 166), CPV (e.g. 261), FTIV (e.g. 252), CVV (e.g. 297), etc., to alter states of devices in the physical world according to the methods depicted below.

As discussed above, purging the canister in PttB mode may enable aggressively purging the canister via immediately commanding a 100% CPV duty cycle, as opposed to ramping up the CPV duty cycle based on feedback provided via an exhaust gas sensor. Furthermore, because the vehicle is stationary, engine speed may be controlled to achieve a desired manifold vacuum which may then be applied to the canister to aggressively purge the canister.

Accordingly, at 803, method 800 may include increasing engine speed. More specifically, engine speed may be controlled in order to achieve a desired/requested intake manifold vacuum for aggressively purging the canister. For example, the controller may specify a particular engine speed for aggressively purging the canister, which may comprise and engine speed in excess of the speed the engine is spun at for power the onboard power box. Pressure in the intake manifold may be monitored via the MAP sensor, for example. Engine speed may be increased by increasing fuel injection and spark to the engine.

As discussed above, any amount of energy generated by rotating the engine at the requested speed at 803 that exceeds the power requested by the onboard power box may be stored at the onboard energy storage device (e.g. battery). In this way, the engine may be used to charge the battery in addition to functioning to purge the canister and supply the onboard power box with power.

Proceeding to 805, method 800 may include commanding open or maintaining open the CVV. At 810, method 800 may include commanding open or maintaining open the FTIV, and commanding closed or maintaining closed the throttle. At 815 the CPV may be commanded on at 100% duty cycle. In this way, engine manifold vacuum may be applied to the canister, and with the CVV open, the vacuum may draw fresh air across the canister to desorb fuel vapors from the canister and route the desorbed fuel vapors to engine intake for combustion.

Proceeding to 820, method 800 may include indicating whether canister load is below the threshold canister load (e.g. a loading state of 5% loaded or less, 10% loaded or less, etc.). In other words, whether the canister is sufficiently cleaned of stored fuel vapors.

Canister load may be inferred based on a rate of decrease in temperature of the canister while the canister is being purged. For example, the temperature sensor (e.g. 232) positioned in the canister may monitor canister temperature, and responsive to the temperature plateauing (e.g. not changing by more than 1-2%), then it may be indicated that the canister load is below the threshold canister load. Additionally or alternatively, canister load may be inferred via engine control strategy based on readings obtained from the exhaust gas sensor (e.g. 237). For example, when the engine control strategy is no longer compensating air/fuel ratio based on fuel vapors being inducted to the engine from the canister, it may be indicated that the canister load is below the threshold canister load.

If, at 820, it is indicated that canister load is not below the threshold canister load, method 800 may return to 815 where the CPV may be continued to be duty cycled at 100% duty cycle. Alternatively, responsive to an indication that canister load is below the predetermined threshold, method 800 may proceed to 825. At 825, method 800 may include commanding closed the CPV. Proceeding to 830, method 800 may include commanding closed the FTIV. The CVV may be maintained open.

Proceeding to 835, method 800 may include updating vehicle operating parameters to reflect the purging event. For example, canister loading state may be updated, and a canister purging schedule updated due to the recent purging event. Proceeding to 840, method 800 may include returning to step 625 of method 600 where it may be determined whether the vehicle operator has requested an override of the PttB mode of operation as discussed above at FIG. 6.

While the above-described methodology for purging the canister included commanding open the FTIV in order to purge fuel vapors from the fuel tank in addition to the canister, it is also possible to purge the canister without also purging fuel vapors from the fuel tank without departing from the scope of this disclosure. In other words, the FTIV may be commanded or maintained closed for conducting the purging operation. Furthermore, while the above-described methodology includes increasing engine speed to a speed greater than that used for operating the onboard power box, in other examples the engine speed may not be increased without departing from the scope of this disclosure. Still further, while the above-described methodology includes commanding the CPV to 100% duty cycle (e.g. fully open) for aggressively purging the canister, it may be understood that in other examples, the CPV may not be immediately commanded to 100% duty cycle without departing from the scope of this disclosure. In other words, the CPV duty cycle may be ramped in similar fashion to that described above, which may serve to prevent any engine hesitation issues associated with purging the canister. In an example where the purging operation is conducted by ramping the CPV duty cycle, conditions being met for conducting the purging operation may not include an indication that the vehicle is unoccupied. Thus, there may be circumstances where it is requested to purge the canister while operating in PttB mode, but where the vehicle is maintained occupied. In such an example, the vehicle controller may make a determination to conduct the purging operation may ramping up the duty cycle of the CPV during the purging operation, to avoid engine stability issues which may otherwise disturb vehicle occupants.

Thus, in one example, the methods described above and with regard to FIGS. 5-8 may enable a method comprising locking a transmission of a vehicle in park until a request to override the locking of the transmission in park is received at a controller of the vehicle, and conducting a diagnostic routine that relies on a vacuum derived from an engine combusting air and fuel while the transmission is locked in park.

In an example of such a method, the locking of the transmission in park is in response to a request to power an onboard power box for supplying power to one or more devices internal or external to the vehicle via energy derived from the engine combusting air and fuel. In such an example, locking the transmission in park prevents the vehicle from being moved until the request to override the locking the transmission in park is received at the controller.

In another example of such a method, the method may further comprise conducting the diagnostic routine in response to an indication that the request to override the locking of the transmission in park will not be received by the controller prior to the diagnostic routine being completed. In such an example, the indication may be based on data related to a learned duration that the transmissions is expected to be locked in park prior to the request to override the locking of the transmission in park.

In another example of such a method, the method may further comprise controlling a speed of the engine for conducting the diagnostic routine, where the speed is variable as a function of the diagnostic routine.

In another example of such a method, conducting the diagnostic routine may include conducting more than one diagnostic routine relying on the vacuum derived from the engine while the transmission is locked in park and prior to the request to override the locking of the transmission in park being received via the controller.

In another example of such a method, the diagnostic routine may involve evacuating an evaporative emissions system and a fuel system of the vehicle until a predetermined negative pressure with respect to atmospheric pressure is reached, then sealing the fuel system and evaporative emissions system, monitoring a pressure bleed-up in the fuel system and the evaporative emissions system. The method may further include indicating a source of undesired evaporative emissions stemming from the fuel system and/or the evaporative emissions system in response to the pressure bleed-up exceeding a predetermined pressure bleed-up threshold. In such an example, the method may further comprise raising a height of the vehicle via an active suspension system just prior to conducting the diagnostic under circumstances where it is determined that the pressure bleed-up is likely to be influenced by fuel vaporization.

In another example of such a method, the diagnostic routine may involve purging a fuel vapor storage canister configured to trap and store fuel vapors, and routing purged fuel vapors to the engine for combustion. In such an example, the method may further comprise purging the fuel vapor storage canister by duty cycling a purge valve at a one hundred percent duty cycle without first duty cycling the purge valve at lower duty cycles, the purge valve positioned in a purge line fluidically coupling the fuel vapor storage canister to an intake of the engine.

In still another example of such a method, the method may further comprise conducting the diagnostic in response to an indication that the vehicle is not occupied.

Another example of a method may comprise locking a transmission of a vehicle in park to prevent the vehicle from being moved until a request to override the locking of the transmission in park is received at a controller of the vehicle. The method may further include operating an engine to combust air and fuel to generate a vacuum for sequentially conducting two diagnostic routines based on the vacuum, prior to the request to override the locking of the transmission in park and while the transmission is locked.

In an example of such a method, the locking of the transmission in park is in response to a request to power an onboard power box for supplying power to one or more devices internal or external to the vehicle via energy derived from the engine combusting air and fuel.

In another example of such a method, sequentially conducting two diagnostic routines may include first conducting a test for a presence or an absence of undesired evaporative emissions stemming from a fuel system and/or an evaporative emissions system of the vehicle, and then conducting an operation to purge a fuel vapor storage canister of stored fuel vapors, the fuel vapor storage canister positioned in the evaporative emissions system. In such an example, the method may further comprise increasing a speed of the engine for conducting the operation to purge the fuel vapor storage canister, as compared to the speed of the engine for conducting the test for the presence or absence of undesired evaporative emissions. Still further, in such a method, a canister purge valve is positioned in a purge line fluidically coupling the fuel vapor storage canister to an intake of the engine, and the purge valve is duty cycled at a one hundred percent duty cycle for both of the two diagnostic routines in order to provide the vacuum for sequentially conducting the two diagnostic routines.

In still another example of such a method, the method may further comprise sequentially conducting the two diagnostic routines while the transmission is locked in park in response to an indication that it is predicted that the request to override the locking of the transmission in park will not be received at the controller prior to both of the two diagnostic routines having been completed.

Turning now to FIG. 9, an example timeline 900 for conducting an EVAP test diagnostic and a canister purging event while the vehicle is being operated in PttB mode is shown. More specifically, it is herein recognized that conducting EVAP tests may load the fuel vapor storage canister with fuel vapors, and for hybrid vehicle systems with limited engine run time outside of PttB mode, finding opportunities to purge the canister can be challenging. Thus, it is desirable, when possible, to conduct an EVAP test immediately followed by a canister purging operation. Because it may be possible to predict/learn what particular PttB mode requests are expected to last long enough to conduct both the EVAP test and the canister purging operation, both operations may be conducted with a high probability of being completed within the predicted duration. By conducting an EVAP test diagnostic followed by immediately conducting a canister purging event, chances of bleed-through emissions from the canister may be reduced or avoided. Furthermore, canister purging during PttB mode may enable aggressive purging, which may purge the canister more efficiently and which may further enable the canister to be purged more rapidly than other instances of canister purging where a duty cycle of the CPV is ramped up over time as discussed above.

Timeline 900 includes plot 905, indicating engine status (on or off), over time. It may be understood that when the engine is on the engine is combusting air and fuel. Timeline 900 further includes plot 910, indicating gear shifter status for a transmission of the vehicle, over time. The gear shifter may be in park, reverse, neutral, or drive. Timeline 900 further includes plot 915, indicating whether PttB mode is requested (yes or no), over time. Timeline 900 further includes plot 920, indicating whether the CVV is open or closed, plot 925, indicating a duty cycle of the CPV (0%-100%), plot 930, indicating whether the FTIV is open or closed, and plot 935, indicating a position of the throttle (open or closed or somewhere between), over time. Timeline 900 further includes plot 940, indicating vehicle height, over time. Vehicle height may be increased (+) or decreased (−) via the active suspension system (e.g. 111). Timeline 900 further includes plot 945, indicating canister load, over time. Canister load may be empty, full, or somewhere between. Timeline 900 further includes plot 950, indicating pressure in the fuel system and evaporative emissions system, over time. Timeline 900 further includes plot 955, indicating whether a source of undesired evaporative emissions is present in the fuel system and/or evaporative emissions system, over time. Timeline 900 further includes plot 960, indicating whether conditions are met for conducting particular diagnostics. The diagnostics may include the EVAP test for presence or absence of undesired evaporative emissions, and canister purging operations.

At time t0, the engine is off (plot 905). The gear shifter is in park (plot 910), and PttB mode has not yet been requested (plot 915). The CVV is open (plot 920), and the CPV is closed (plot 925). The FTIV is closed (plot 930), and the throttle is in the position in was in at engine shutdown (plot 935). Vehicle height (plot 940) is at a particular vehicle height set by the active suspension system. The canister is loaded to about 40% full (plot 945). With the fuel system sealed via the FTIV being closed, pressure in the fuel system is above atmospheric pressure (plot 950). A source of undesired evaporative emissions has not yet been indicated (plot 955), and conditions are not indicated to be met for either conducting the EVAP test diagnostic or for purging the fuel vapor storage canister (plot 960).

At time t1, PttB mode is requested via the vehicle operator (plot 915). With PttB mode requested at time t1, the engine is pulled up at time t2 to combust air and fuel (plot 905). While not explicitly illustrated, once PttB mode is requested, the vehicle transmission is locked in park (see plot 910), and cannot be moved from park until the PttB mode request is overridden. At time t3, conditions are indicated to be met for conducting an EVAP test diagnostic. Thus, it may be understood that the vehicle controller has determined that this particular PttB mode request comprises a learned PttB mode request, and that this particular PttB mode request has a high likelihood of lasting for a duration longer than an amount of time it takes to conduct the EVAP test diagnostic. Furthermore, while not explicitly illustrated, it may be understood that by indicating conditions are met for conducting the EVAP test, the vehicle controller has determined that the vehicle is not currently occupied, that an EVAP test is requested, and that there are no standing indications of a source of undesired evaporative emissions stemming from the fuel system and/or evaporative emissions system.

Furthermore, with conditions met at time t3, a heat rejection index is determined, and in this example illustration, while not explicitly illustrated, it may be understood that the vehicle controller has determined that the heat rejection index is greater than a heat rejection index threshold (see step 705 at FIG. 7). In other words, based on one or more of engine run time just prior to the PttB mode request, aggressiveness of the engine run-time, ambient temperature, levels of precipitation, wind speed/direction, ground surface temperature, etc., it has been determined that fuel vaporization issues may adversely impact the interpretation of the EVAP test diagnostic procedure. Thus, to avoid such issues related to fuel vaporization, the controller has determined that the vehicle should be raised a predetermined amount. As discussed above, the predetermined amount may be a function of how far above the heat rejection index threshold the heat rejection index is. Accordingly, between time t3 and t4, vehicle height is increased via the active suspension system, and at time t4 the predetermined amount for raising the vehicle is met, thus the vehicle is stopped from being further raised at time t4.

At time t4, with the vehicle raised the predetermined amount, the FTIV is commanded open. With the FTIV commanded open the fuel system is fluidically coupled to atmosphere via the open CVV, and accordingly, between time t4 and t5, pressure in the fuel system and evaporative emissions system declines to atmospheric pressure. Because there was positive pressure with respect to atmospheric pressure in the fuel system prior to commanding open the FTIV, fuel vapors in the fuel system are routed to the canister between time t4 and t5, further loading the canister with fuel vapors.

At time t5, the throttle is commanded closed, the CVV is commanded closed, and the CPV is commanded open. In this way, engine manifold vacuum is drawn on the otherwise sealed fuel system and evaporative emissions system. Accordingly, between time t5 and t6, pressure in the fuel system and evaporative emissions system is reduced, and at time t6, the negative pressure threshold is reached, indicated by dashed line 951.

With the negative pressure threshold reached at time t6, the CPV is commanded closed, thus sealing the fuel system and evaporative emissions system from engine intake. Between time t6 and t7, pressure bleed-up is monitored in the fuel system and evaporative emissions system. In this example timeline, pressure bleed-up remains below a pressure bleed-up threshold, represented by dashed line 952. Accordingly, at time t7, it is indicated that there is an absence of undesired evaporative emissions stemming from the fuel system and evaporative emissions system. The passing result is stored at the controller at time t7.

Between time t7 and t8, while not explicitly illustrated, it may be understood that the vehicle controller determines whether conditions are met for conducting a canister purging operation. Specifically, the controller determines whether the current learned PttB mode request is of a duration where the canister may be sufficiently purged of fuel vapors prior to the PttB mode request being overridden. In other words, the controller determines whether it is expected that there is enough time remaining in the PttB mode request to also conduct the canister purging operation. The determination may be based on how loaded the canister is, which in this example timeline, the canister is nearly full, thus requiring more time to purge the canister as opposed to situations where the canister is not nearly full.

At time t8, the controller determines that there is predicted to be enough time remaining to conduct the purging operation. It may be understood that a reason why it is desirable to finish the canister purging operation prior to the request for PttB mode being overridden is because the engine may be shut down upon the request being overridden, in the event that the vehicle operator does not immediately drive the vehicle. Even if the vehicle were to be immediately driven, the purging operation may result in some level of engine hesitation, and thus it is desirable to conduct the purging operation while the vehicle is not occupied.

With conditions being indicated to be met for conducting the purging operation, the CPV is commanded open (100% duty cycle), and the CVV is also commanded open. While not explicitly illustrated, it may be understood that in some examples engine speed may first be increased in order to achieve a desired manifold vacuum level just prior to (e.g. within 10 seconds or less, or 20 seconds or less) commanding open the CPV and the CVV. Higher levels of engine speed may translate to greater vacuum applied on the canister, which may be used under circumstances where increased aggressiveness of canister purging is desired. In some examples, an amount of time it takes to purge the canister may be decreased if engine manifold is increased, which may be useful for situations where there is not a lot of leeway in terms of when it is predicted that the PttB mode will be overridden. In other words, the canister may be purged aggressively in some examples to ensure that the canister purging is event is over by the time the PttB mode is overridden.

Accordingly, between time t8 and t9, negative pressure with respect to atmospheric pressure is applied on the canister, and accordingly, canister load decreases (plot 945) as fuel vapors are desorbed from the canister and routed to the engine for combustion. At time t9, the canister is indicated to be sufficiently cleaned (e.g. less than 5% loaded), and thus conditions are no longer indicated to be met for conducting the purging operation. Accordingly, at time t9, the CPV is commanded closed, and the CVV is maintained open. The throttle is returned to the position it was in prior to initiating the EVAP test diagnostic and canister purging operation. Between time t9 and t10, pressure in the fuel system and evaporative emissions system returns to atmospheric pressure, due to the FTIV being open and the CVV being open. Furthermore, between time t9 and t10, the vehicle is returned to the height it was at prior to conducting the EVAP test and canister purging operation. At time t10, the FTIV is commanded closed. After time t10 the engine is maintained on, as PttB mode is still requested.

In the above example timeline, while the vehicle height is indicated to be maintained at its increased level during the purging operation of the canister, it may be understood that in other examples the vehicle height may be lowered to its original position prior to conducting the canister purging operation without departing from the scope of this disclosure.

In this way, vehicle operations such as testing for the presence or absence of undesired evaporative emissions and/or conducting canister purging operations may be conducted during situations where the engine is in operation but where the vehicle is locked in a mode that prevents the vehicle from being moved until an override of the mode is requested. In this way, completion rates for the vehicle operations may be improved, and release of undesired evaporative emissions to atmosphere may be reduced.

The technical effect is to recognize that when the vehicle is operating in PttB mode, engine operation may be additionally utilized to evacuate the fuel system and/or evaporative emissions system to conduct an EVAP test and/or conduct canister purging operations. A further technical effect is to recognize that in some examples, results obtained via conducting the EVAP test while the vehicle is being operated in PttB mode may be improved (more robust/reliable) if a height of the vehicle is raised prior to initiating the test. A further technical effect is to recognize that canister purging operations may be conducted in a more aggressive fashion when the vehicle is operating in PttB mode, than when the vehicle is in motion or even at an idle stop where the vehicle is occupied. A still further technical effect is to recognize that when the vehicle is being operated in PttB mode, there exists a unique opportunity to conduct the EVAP test which may further load the canister with fuel vapors, and a canister purging operation sequentially. In doing so, opportunities for bleed-through emissions may be greatly reduced or avoided altogether.

The systems discussed herein and with regard to FIGS. 1-2, along with the methods depicted herein and with regard to FIGS. 5-8, may enable one or more systems and one or more methods. In one example, a method comprises locking a transmission of a vehicle in park until a request to override the locking of the transmission in park is received at a controller of the vehicle; and conducting a diagnostic routine that relies on a vacuum derived from an engine combusting air and fuel while the transmission is locked in park. In a first example of the method includes wherein the locking of the transmission in park is in response to a request to power an onboard power box for supplying power to one or more devices internal or external to the vehicle via energy derived from the engine combusting air and fuel; and wherein locking the transmission in park prevents the vehicle from being moved until the request to override the locking the transmission in park is received at the controller. A second example of the method optionally includes the first example, and further comprises conducting the diagnostic routine in response to an indication that the request to override the locking of the transmission in park will not be received by the controller prior to the diagnostic routine being completed. A third example of the method optionally includes any one or more or each of the first and second examples, and further includes wherein the indication is based on data related to a learned duration that the transmission is expected to be locked in park prior to the request to override the locking of the transmission in park. A fourth example of the method optionally includes any one or more or each of the first through third examples, and further comprises controlling a speed of the engine for conducting the diagnostic routine, where the speed is variable as a function of the diagnostic routine. A fifth example of the method optionally includes any one or more or each of the first through fourth examples, and further includes wherein conducting the diagnostic routine includes conducting more than one diagnostic routine relying on the vacuum derived from the engine while the transmission is locked in park and prior to the request to override the locking of the transmission in park being received via the controller. A sixth example of the method optionally includes any one or more or each of the first through fifth examples, and further includes wherein the diagnostic routine involves evacuating an evaporative emissions system and a fuel system of the vehicle until a predetermined negative pressure with respect to atmospheric pressure is reached, then sealing the fuel system and evaporative emissions system, monitoring a pressure bleed-up in the fuel system and the evaporative emissions system; and indicating a source of undesired evaporative emissions stemming from the fuel system and/or the evaporative emissions system in response to the pressure bleed-up exceeding a predetermined pressure bleed-up threshold. A seventh example of the method optionally includes any one or more or each of the first through sixth examples, and further comprises raising a height of the vehicle via an active suspension system just prior to conducting the diagnostic under circumstances where it is determined that the pressure bleed-up is likely to be influenced by fuel vaporization. An eighth example of the method optionally includes any one or more or each of the first through seventh examples, and further includes wherein the diagnostic routine involves purging a fuel vapor storage canister configured to trap and store fuel vapors, and routing purged fuel vapors to the engine for combustion. A ninth example of the method optionally includes any one or more or each of the first through eighth examples, and further comprises purging the fuel vapor storage canister by duty cycling a purge valve at a one hundred percent duty cycle without first duty cycling the purge valve at lower duty cycles, the purge valve positioned in a purge line fluidically coupling the fuel vapor storage canister to an intake of the engine. A tenth example of the method optionally includes any one or more or each of the first through ninth examples, and further comprises conducting the diagnostic in response to an indication that the vehicle is not occupied.

Another example of a method comprises locking a transmission of a vehicle in park to prevent the vehicle from being moved until a request to override the locking of the transmission in park is received at a controller of the vehicle; and operating an engine to combust air and fuel to generate a vacuum for sequentially conducting two diagnostic routines based on the vacuum, prior to the request to override the locking of the transmission in park and while the transmission is locked. In a first example of the method, the method further includes wherein the locking of the transmission in park is in response to a request to power an onboard power box for supplying power to one or more devices internal or external to the vehicle via energy derived from the engine combusting air and fuel. A second example of the method optionally includes the first example, and further includes wherein sequentially conducting two diagnostic routines includes first conducting a test for a presence or an absence of undesired evaporative emissions stemming from a fuel system and/or an evaporative emissions system of the vehicle, and then conducting an operation to purge a fuel vapor storage canister of stored fuel vapors, the fuel vapor storage canister positioned in the evaporative emissions system. A third example of the method optionally includes any one or more or each of the first through second examples, and further comprises increasing a speed of the engine for conducting the operation to purge the fuel vapor storage canister, as compared to the speed of the engine for conducting the test for the presence or absence of undesired evaporative emissions. A fourth example of the method optionally includes any one or more or each of the first through third examples, and further includes wherein a canister purge valve positioned in a purge line fluidically coupling the fuel vapor storage canister to an intake of the engine is duty cycled at a one hundred percent duty cycle for both of the two diagnostic routines in order to provide the vacuum for sequentially conducting the two diagnostic routines. A fifth example of the method optionally includes any one or more or each of the first through fourth examples, and further comprises sequentially conducting the two diagnostic routines while the transmission is locked in park in response to an indication that it is predicted that the request to override the locking of the transmission in park will not be received at the controller prior to both of the two diagnostic routines having been completed.

An example of a system for a hybrid vehicle comprises an onboard power box that receives power from a generator that is in turn powered by an engine, the onboard power box capable of supplying power to one or more devices external to the hybrid vehicle; and a controller with computer readable instructions stored on non-transitory memory that when executed during a condition where the engine is operating to supply power to the onboard power box, cause the controller to: conduct one or more diagnostic routines that rely on a vacuum derived from the engine combusting air and fuel in response to an indication that it is predicted that a duration for which the engine is requested to supply power to the onboard power box is of a greater duration than a timeframe for conducting the one or more diagnostic routines. In a first example of the system, the system further comprises a vehicle instrument panel capable of receiving a first request from a vehicle operator to supply power to the onboard power box; and wherein the controller stores further instructions to, in response to the first request to supply power to the onboard power box, lock a transmission of the hybrid vehicle in park to prevent the hybrid vehicle from moving until a second request from the vehicle operator to override the first request is received via the vehicle instrument panel. A second example of the system optionally includes the first example, and further comprises one or more of seat load cells, door sensing technology, and onboard cameras capable of indicating whether the hybrid vehicle is occupied; and wherein the controller stores further instructions to conduct the one or more diagnostic routines that rely on a vacuum derived from the engine combusting air and fuel in response to an indication that the hybrid vehicle is unoccupied.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   locking a transmission of a vehicle in park until a request to override the locking of the transmission in park is received at a controller of the vehicle; and
   conducting a diagnostic routine that relies on a vacuum derived from an engine combusting air and fuel while the transmission is locked in park.

2. The method of claim 1, wherein the locking of the transmission in park is in response to a request to power an onboard power box for supplying power to one or more devices internal or external to the vehicle via energy derived from the engine combusting air and fuel; and wherein locking the transmission in park prevents the vehicle from being moved until the request to override the locking the transmission in park is received at the controller.

3. The method of claim 1, further comprising conducting the diagnostic routine in response to an indication that the request to override the locking of the transmission in park will not be received by the controller prior to the diagnostic routine being completed.

4. The method of claim 3, wherein the indication is based on data related to a learned duration that the transmission is expected to be locked in park prior to the request to override the locking of the transmission in park.

5. The method of claim 1, further comprising controlling a speed of the engine for conducting the diagnostic routine, where the speed is variable as a function of the diagnostic routine.

6. The method of claim 1, wherein conducting the diagnostic routine includes conducting more than one diagnostic routine relying on the vacuum derived from the engine while the transmission is locked in park and prior to the request to override the locking of the transmission in park being received via the controller.

7. The method of claim 1, wherein the diagnostic routine involves evacuating an evaporative emissions system and a fuel system of the vehicle until a predetermined negative pressure with respect to atmospheric pressure is reached, then sealing the fuel system and evaporative emissions system, monitoring a pressure bleed-up in the fuel system and the evaporative emissions system; and
   indicating a source of undesired evaporative emissions stemming from the fuel system and/or the evaporative emissions system in response to the pressure bleed-up exceeding a predetermined pressure bleed-up threshold.

8. The method of claim 7, further comprising raising a height of the vehicle via an active suspension system just prior to conducting the diagnostic under circumstances where it is determined that the pressure bleed-up is likely to be influenced by fuel vaporization.

9. The method of claim 1, wherein the diagnostic routine involves purging a fuel vapor storage canister configured to trap and store fuel vapors, and routing purged fuel vapors to the engine for combustion.

10. The method of claim 9, further comprising purging the fuel vapor storage canister by duty cycling a purge valve at a one hundred percent duty cycle without first duty cycling the purge valve at lower duty cycles, the purge valve positioned in a purge line fluidically coupling the fuel vapor storage canister to an intake of the engine.

11. The method of claim 1, further comprising conducting the diagnostic in response to an indication that the vehicle is not occupied.

12. A method comprising:
    locking a transmission of a vehicle in park to prevent the vehicle from being moved until a request to override the locking of the transmission in park is received at a controller of the vehicle; and
    operating an engine to combust air and fuel to generate a vacuum for sequentially conducting two diagnostic routines based on the vacuum, prior to the request to override the locking of the transmission in park and while the transmission is locked.

13. The method of claim 12, wherein the locking of the transmission in park is in response to a request to power an onboard power box for supplying power to one or more devices internal or external to the vehicle via energy derived from the engine combusting air and fuel.

14. The method of claim 12, wherein sequentially conducting two diagnostic routines includes first conducting a test for a presence or an absence of undesired evaporative emissions stemming from a fuel system and/or an evaporative emissions system of the vehicle, and then conducting an operation to purge a fuel vapor storage canister of stored fuel vapors, the fuel vapor storage canister positioned in the evaporative emissions system.

15. The method of claim 14, further comprising increasing a speed of the engine for conducting the operation to purge the fuel vapor storage canister, as compared to the speed of the engine for conducting the test for the presence or absence of undesired evaporative emissions.

16. The method of claim 14, wherein a canister purge valve positioned in a purge line fluidically coupling the fuel vapor storage canister to an intake of the engine is duty cycled at a one hundred percent duty cycle for both of the two diagnostic routines in order to provide the vacuum for sequentially conducting the two diagnostic routines.

17. The method of claim 12, further comprising sequentially conducting the two diagnostic routines while the transmission is locked in park in response to an indication that it is predicted that the request to override the locking of the transmission in park will not be received at the controller prior to both of the two diagnostic routines having been completed.

18. A system for a hybrid vehicle comprising:
an onboard power box that receives power from a generator that is in turn powered by an engine, the onboard power box capable of supplying power to one or more devices external to the hybrid vehicle; and
a controller with computer readable instructions stored on non-transitory memory that when executed during a condition where the engine is operating to supply power to the onboard power box, cause the controller to:
conduct one or more diagnostic routines that rely on a vacuum derived from the engine combusting air and fuel in response to an indication that it is predicted that a duration for which the engine is requested to supply power to the onboard power box is of a greater duration than a timeframe for conducting the one or more diagnostic routines.

19. The system of claim 18, further comprising:
a vehicle instrument panel capable of receiving a first request from a vehicle operator to supply power to the onboard power box; and
wherein the controller stores further instructions to, in response to the first request to supply power to the onboard power box, lock a transmission of the hybrid vehicle in park to prevent the hybrid vehicle from moving until a second request from the vehicle operator to override the first request is received via the vehicle instrument panel.

20. The system of claim 18, further comprising:
one or more of seat load cells, door sensing technology, and onboard cameras capable of indicating whether the hybrid vehicle is occupied; and
wherein the controller stores further instructions to conduct the one or more diagnostic routines that rely on a vacuum derived from the engine combusting air and fuel in response to an indication that the hybrid vehicle is unoccupied.

* * * * *